United States Patent [19]

Reinhardt et al.

[11] Patent Number: 5,354,152

[45] Date of Patent: Oct. 11, 1994

[54] METHOD AND APPARATUS FOR CONVEYING ICE LUMPS

[75] Inventors: Robert C. Reinhardt, Shannon; Richard M. Humphreys, Mount Merrion, both of Ireland

[73] Assignee: EOLAS - The Irish Science and Technology Agency, Dublin, Ireland

[21] Appl. No.: 726,679

[22] Filed: Jul. 8, 1991

[30] Foreign Application Priority Data

| Jul. 6, 1990 [IE] | Ireland | 2451/90 |
| Jul. 6, 1990 [IE] | Ireland | 2454/90 |
| Mar. 4, 1991 [IE] | Ireland | 704/91 |
| Apr. 24, 1991 [IE] | Ireland | 1362/91 |

[51] Int. Cl.$^5$ .............................. B65G 53/06
[52] U.S. Cl. ........................... 406/3; 406/23; 406/30; 406/182
[58] Field of Search ............ 406/3, 197, 123, 128, 406/50, 14, 23, 30, 110, 67

[56] References Cited

U.S. PATENT DOCUMENTS

| 2,015,959 | 10/1935 | Needham. | |
| 2,903,302 | 9/1959 | Ross | 406/67 |
| 3,380,780 | 4/1968 | Allen et al. | |
| 3,537,187 | 11/1970 | Cvacho et al. | |
| 3,580,416 | 5/1971 | Hoenisch | 221/203 |
| 3,791,046 | 2/1974 | Bruggink, Sr. | |
| 3,877,241 | 4/1975 | Wade | 406/3 X |
| 3,903,377 | 1/1976 | Utter | 406/191 X |
| 4,055,280 | 10/1977 | Kohl et al. | 406/183 X |
| 4,104,889 | 8/1978 | Hoenisch | 406/84 X |
| 4,158,426 | 6/1979 | Fronbieter. | |
| 4,775,267 | 10/1988 | Yamamoto | 406/50 |

FOREIGN PATENT DOCUMENTS

| 0296803 | 12/1988 | European Pat. Off. . |
| 379544 | 9/1932 | United Kingdom. |
| 2116284 | 9/1983 | United Kingdom. |

OTHER PUBLICATIONS

Patent Abstracts of Japan, vol. 9, No. 80 (M-370) [1803], Apr. 10, 1985; & JP-A-59 209 991 (Touhou Kikai Kogyo K.K.) Nov. 28, 1984.

Oil and Petrochemical Equipment News, vol. 12, Nov. 1966, pp. 44, 45, London, GB; J. R. H. Brown: "Pipeline spheres and launching receiving equipment".

*Primary Examiner*—David M. Mitchell
*Assistant Examiner*—Gary C. Hoge
*Attorney, Agent, or Firm*—Sughrue, Mion, Zinn, Macpeak & Seas

[57] ABSTRACT

In apparatus for conveying batches of ice lumps from a storage hopper to remotely located ice dispensers, ice lumps from the storage hopper are delivered into the main conduits through corresponding main valves and connecting conduits extending between each main valve and the storage hopper. Metering valves meter batches of ice lumps of predetermined size into the main conduits. Conveying air from an air blower is supplied to the main conduits through the main valves for conveying the batches of ice lumps. In use, batches of ice lumps are intermittently delivered into the main conduit, and the batches of ice lumps and conveying air are alternately supplied to the main conduit.

15 Claims, 19 Drawing Sheets

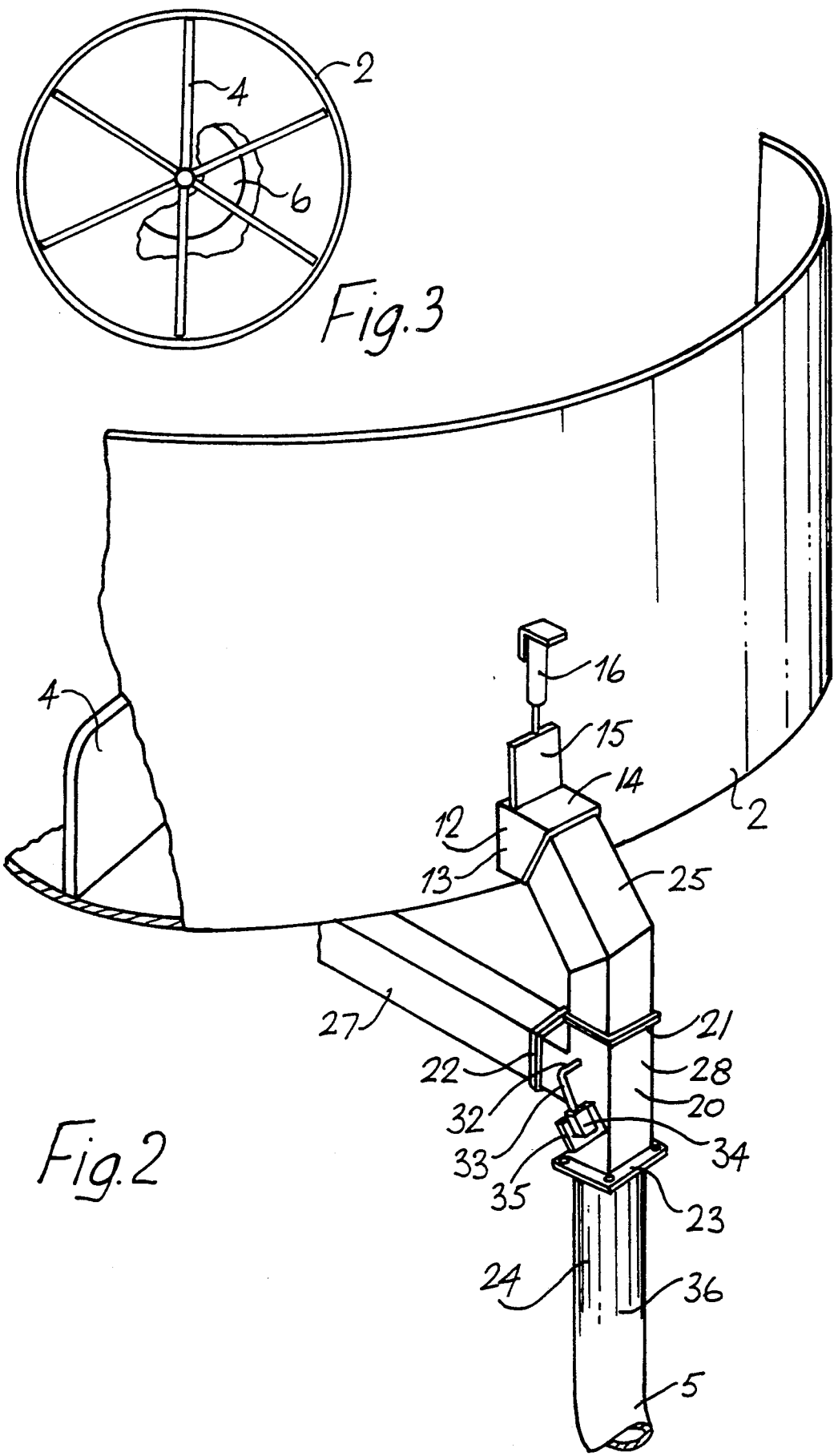

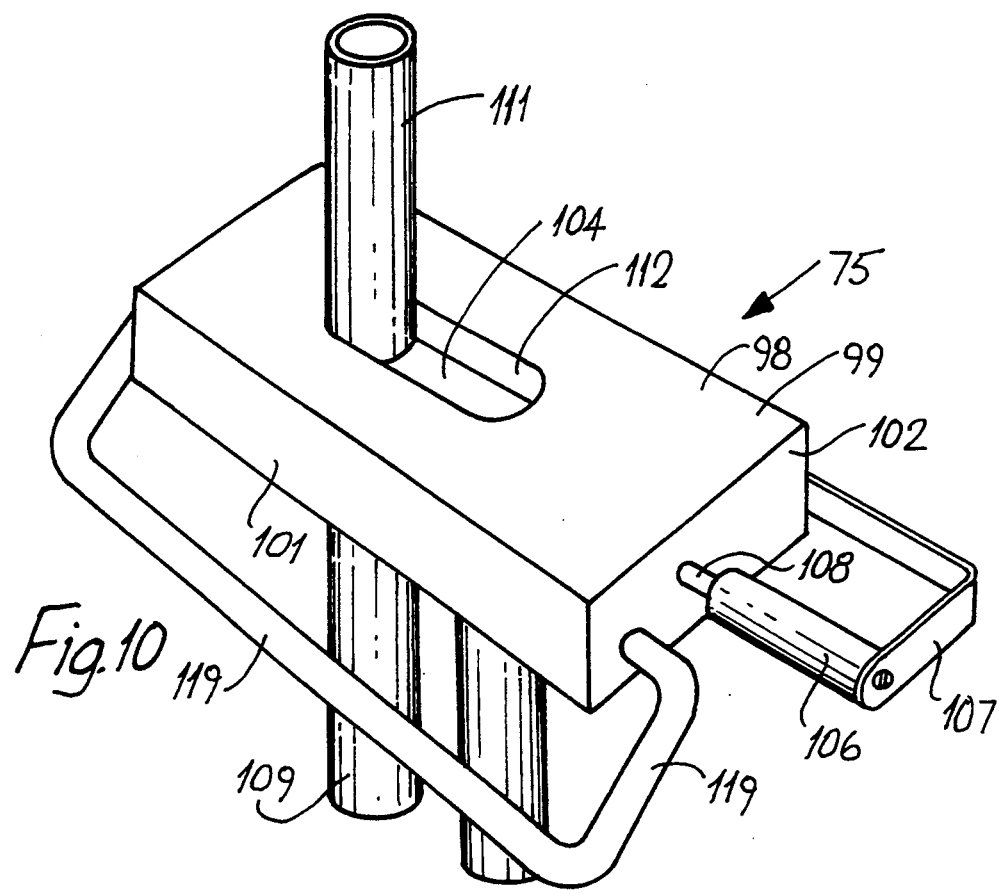
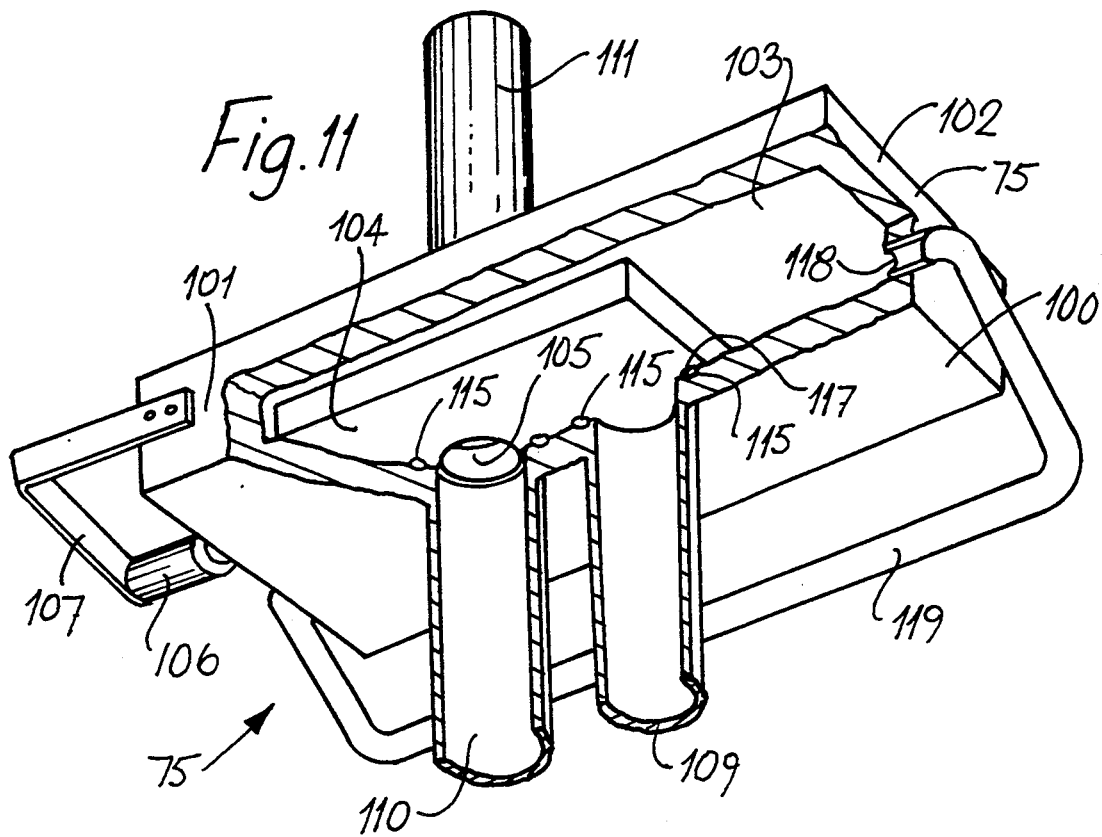

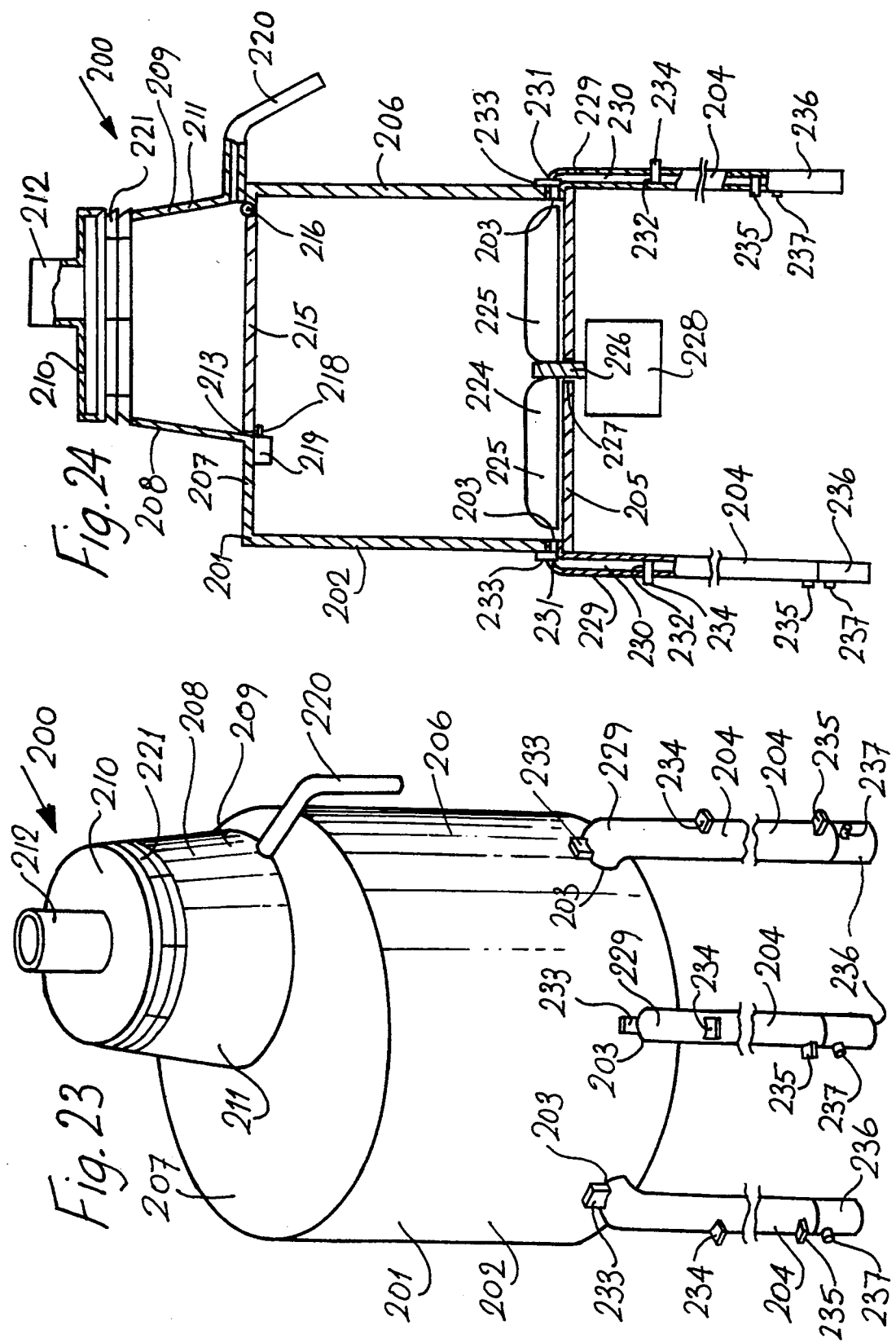

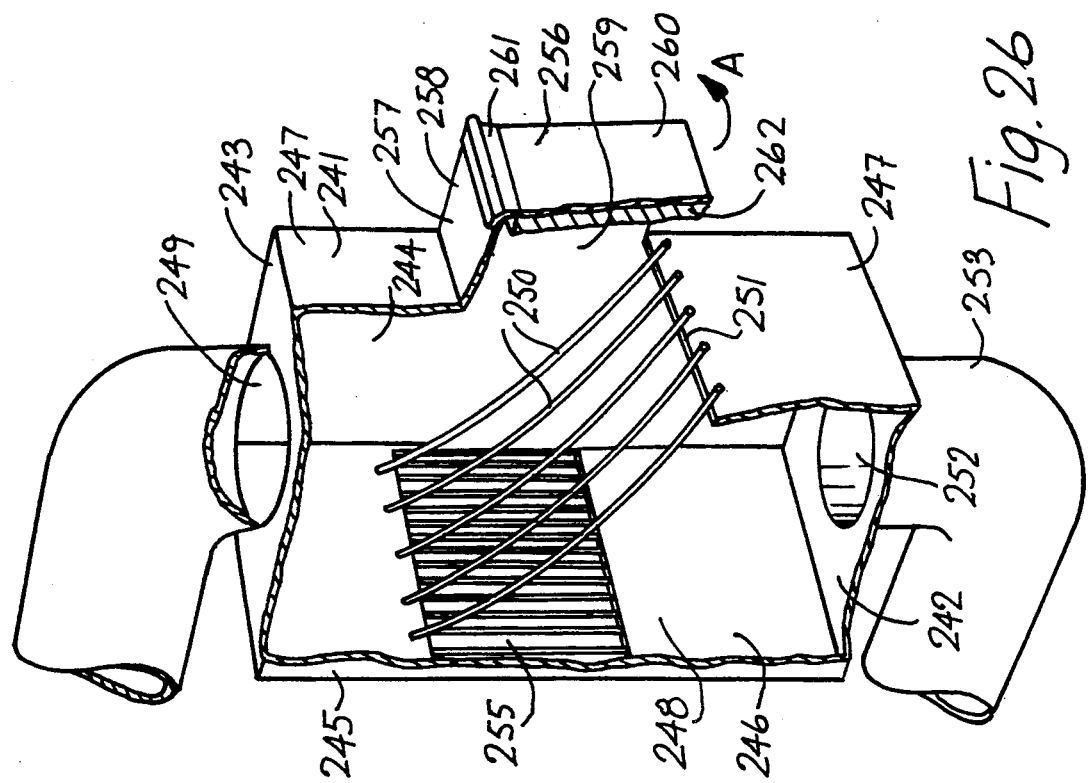
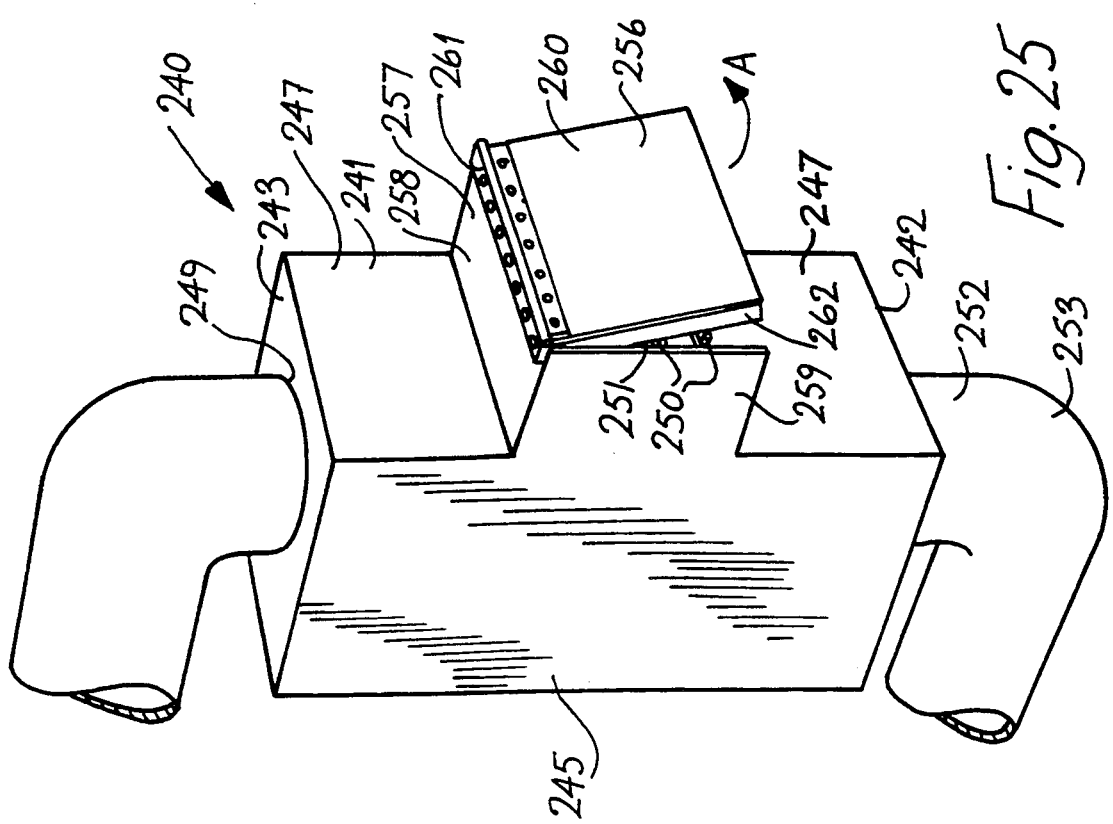

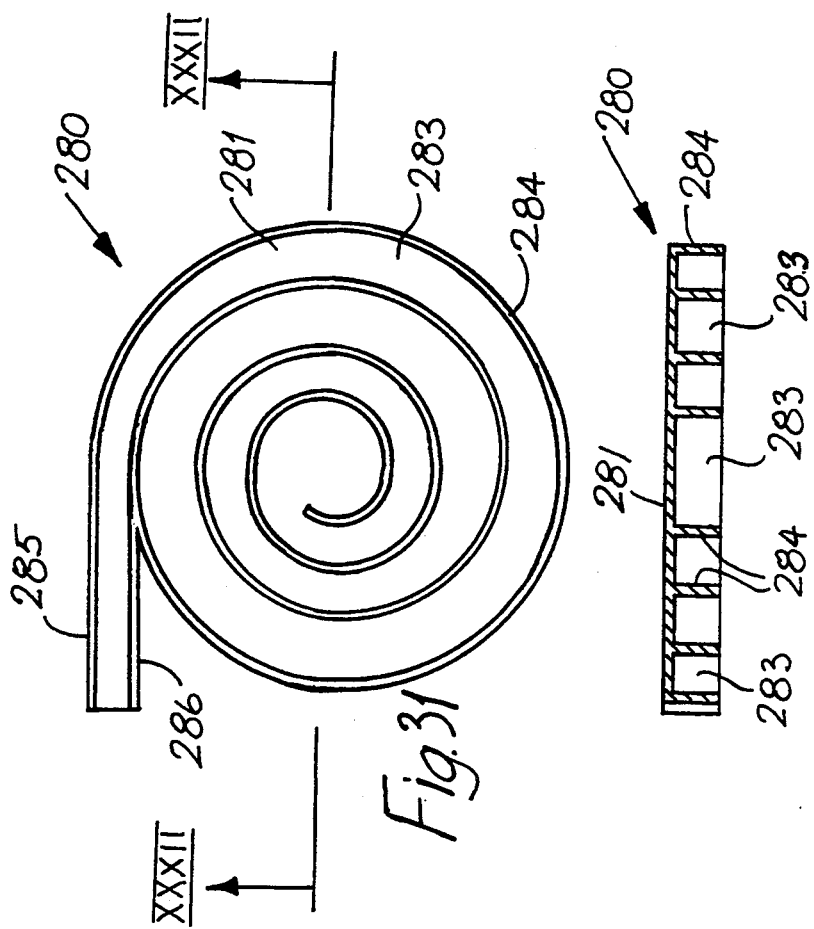
Fig. 31
Fig. 32
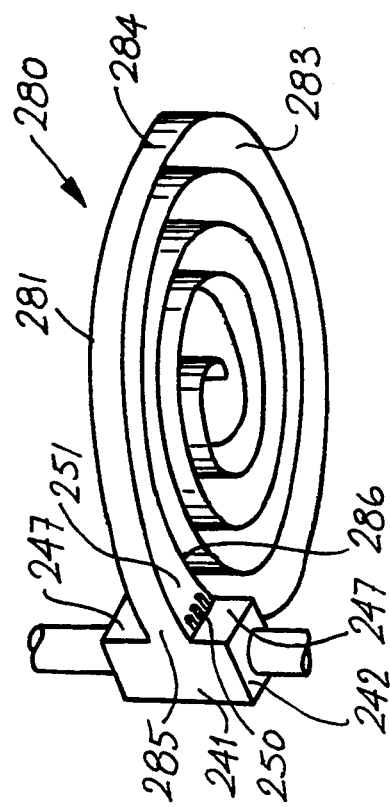
Fig. 30

METHOD AND APPARATUS FOR CONVEYING ICE LUMPS

FIELD OF THE INVENTION

The present invention relates to a method and apparatus for conveying ice lumps from an ice lump source to a remote location. The term ice lump as used throughout this specification and the claims is intended to mean any type, size or shape of ice lump, for example, an ice lump of the type typically referred to as an ice cube commonly used in beverages, such ice lumps may be of any shape besides being cubic. Such ice lumps may be of regular or irregular shape, cylindrical shape, prismatic shape, spiral shape, and the like, and, indeed, such ice lumps may be hollow. The term ice lump is also intended to include a flake or particle of ice, such as, for example, flake ice, commonly used for cooling purposes. The term ice lump is also intended to include crushed ice. Needless to say, the term would also include an ice lump made from compressed flake ice. The invention also relates to a holding device for holding a batch of ice lumps for use in the conveying apparatus. Further, the invention relates to metering apparatus for metering a metered quantity of ice lumps. Additionally, the invention relates to a separator for separating ice lumps from a conveying medium.

BACKGROUND TO THE INVENTION

Apparatus for conveying ice lumps from an ice lump source to a plurality of remote locations is disclosed in U.S. Pat. No. 4,104,889. U.S. Pat. No. 3,877,241 also discloses apparatus for conveying ice lumps from an ice lump source to a plurality of remote locations. However, the conveying apparatus disclosed in these U.S. patent specifications, as well as other conveying apparatus of the prior art, have been found to be unsatisfactory. Most ice lump conveying apparatus tend to be relatively complex, relatively noisy, require excessive energy and cause excessive melting of the ice lumps. In the conveying apparatus disclosed in U.S. Pat. No. 3,877,241 a conveying conduit extends between the ice lump source and the remote locations. A main conduit extends from the ice lump source, and a plurality of secondary conduits connected to the main conduit deliver the ice lumps to respective remote locations. Diverter valves connect the secondary conduits to the main conduit. Storage bins are provided at the remote locations for receiving the ice lumps and the ice lump source is provided by an ice maker. In the apparatus of this U.S. specification, conveying air is continuously delivered through the main conduit for conveying the ice lumps to the remote location. The conveying air is delivered into the main conduit by an air blower. On ice being required, a diverter valve diverts the ice lumps into the secondary conduit, which conveys the ice lumps to the appropriate storage bin. In this apparatus, air is recirculated to the source.

In the conveying apparatus of this U.S. specification, the air and ice lumps are continuously and simultaneously fed into and through the conveying conduit until a demand for ice lumps has been satisfied.

U.S. Pat. No. 4,104,889 discloses substantially similar apparatus to that disclosed in U.S. Pat. No. 3,877,241. In the conveying apparatus of U.S. Pat. No. 4,104,889 conveying air and ice lumps are continuously and simultaneously fed into and through the conveying conduit until a demand for ice at a remote location has been satisfied.

These conveying apparatus suffer from the disadvantages already described, in that they require excessive energy, they cause deterioration of the ice lumps and are unsuitable for delivering ice lumps over relatively long distances.

There is therefore a need for a conveying apparatus which overcomes these problems.

The present invention is directed towards providing a method and conveying apparatus for conveying ice lumps from an ice lump source to a remote location. The invention is also directed towards providing a holding device for holding a batch of ice lumps for use in conveying apparatus. The invention is further directed towards metering apparatus for metering a quantity of ice lumps, and the invention is also directed towards a separator for separating ice lumps from a conveying medium.

OBJECTS OF THE INVENTION

One object of the invention is to provide a conveying apparatus for conveying ice lumps from an ice lump source to a remote location which overcomes the problems of known prior art. Another object of the invention is to provide a method for conveying ice lumps from an ice lump source to a remote location which also overcomes the problems of known prior art methods. The invention is further directed towards providing conveying apparatus and a method for conveying ice lumps from an ice lump source to a remote location in which the energy requirement is relatively low and which is suitable for conveying ice lumps over relatively long distances, and which does not generate excessive noise, and furthermore which minimises the risk of melting of the ice lumps.

A further object of the invention is to provide a holding device for use in a conveying apparatus for holding a batch of ice lumps prior to being delivered into a storage bin, at, for example, a remote location.

A further object of the invention is to provide a metering apparatus for metering a metered quantity of ice lumps from, for example, an ice lump dispenser. Typically, such a metered quantity would comprise a sufficient number of ice lumps for a glass of beverage.

Another object of the invention is to provide a separator for separating ice lumps from a conveying medium.

SUMMARY OF THE INVENTION

According to the invention, there is provided a method for conveying ice lumps from an ice lump source to a remote location through a conveying conduit means, the method comprising the steps of:

delivering a batch of ice lumps into the conveying conduit means at an upstream end of the conveying conduit means, and supplying a conveying medium to the conveying conduit means after the batch of ice lumps has been delivered into the conveying conduit means for conveying the batch of ice lumps to the remote location.

The advantages of the invention are many. The method of the invention is suitable for conveying ice lumps over relatively long distances. Furthermore, the energy requirements are relatively low, and the noise generated by apparatus using the method is also relatively low. Additionally, the risk of melting of the ice lumps is minimised. It is believed that these advantages result from the fact that the ice lumps are conveyed in batches. Furthermore, the fact that ice lumps and conveying medium are alternately supplied to the conveying conduit further facilitates in providing the advantages.

In one embodiment of the invention, the method comprises the step of alternately delivering a batch of ice lumps and supplying conveying medium to the conveying conduit means for conveying a plurality of batches of ice lumps.

The advantage of this feature of the invention is that the method is particularly suitable for conveying relatively large quantities of ice lumps in small batches over relatively long distances.

In another embodiment of the invention, the supply of conveying medium is cut off to the conveying conduit means on each batch of ice lumps having been delivered to the remote location.

The advantage of this feature of the invention is that it provides a relatively efficient method and in particular, an energy efficient method.

Preferably, only one batch of ice lumps is in the conveying conduit means at any one time.

The advantage of this feature of the invention is that the method is particularly suitable for conveying ice lumps over relatively long distances with relatively low energy requirements and at relatively low noise. It is believed that this feature contributes considerably to minimising the risk of melting of the ice lumps. It has been found that where some melting of the ice lumps does occur, this, in general, is minimal.

In one embodiment of the invention, the method comprises the step of monitoring the conveying conduit means to determine when a batch of ice lumps has been delivered to a remote location.

The advantage of this feature of the invention is that it provides a relatively efficient method of conveying ice lumps.

In another embodiment of the invention, the next batch of ice lumps is delivered into the conveying conduit means on the previous batch having been delivered to the remote location.

This feature of the invention results in a particularly efficient method and also provides for the relatively rapid delivery of ice lumps to a remote location.

In one embodiment of the invention, the method further comprises the step of polling the remote location to determine if a demand for ice lumps exists, and on a demand being determined to exist at the remote location, conveying a predetermined number of batches of ice lumps to the remote location.

The advantage of this feature of the invention is that it provides a relatively simple, effective and at the same time an efficient method. Where the method is applied to conveying apparatus, the conveying apparatus is of relatively simple construction and can be readily easily and simply maintained.

In a further embodiment of the invention, the conveying conduit means delivers batches of ice lumps to a plurality of remote locations, the method further comprising the steps of sequentially polling the remote locations to determine if a demand for ice lumps exists at the remote locations, and on a demand being determined to exist at a remote location, conveying at least one batch of ice lumps to that remote location before polling the next sequential remote location.

The advantage of this feature of the invention is that it provides a method which enables ice lumps to be conveyed from a single ice lump source to a plurality of remote locations in a relatively efficient manner.

In a further embodiment of the invention, a plurality of batches of ice lumps are delivered to a remote location on a demand being determined to exist at that remote location.

The advantage of this feature of the invention is that it provides a particularly efficient method for delivering the ice lumps to the remote location.

In one embodiment of the invention, the method includes the step of setting conveying conduit means to communicate the ice lump source with the remote location demanding ice lumps prior to a batch of ice lumps being delivered into the conveying conduit means.

The advantage of this feature of the invention is that it leads to a relatively efficient and cost effective method for conveying ice lumps.

In a further embodiment of the invention, the method further comprises the step of supplying the conveying medium to the conveying conduit means prior to setting the conveying conduit means for clearing the conveying conduit means of residual matter prior to setting the conveying conduit means.

The advantage of this feature of the invention is that it ensures that any residual matter, for example, ice lumps remaining from the conveying of a previous batch of ice lumps are cleared from the conveying conduit means prior to setting the conveying conduit means.

Additionally, the invention provides a method for conveying ice lumps from an ice lump source to a remote location through a conveying conduit means, the method comprising the steps of:

intermittently delivering a plurality of batches of ice lumps into the conveying conduit means at an upstream end of the conveying conduit means, and continuously supplying a conveying medium to the conveying conduit means for conveying the intermittently delivered batches of ice lumps to the remote location.

The advantage of this aspect of the invention is that it provides a relatively efficient and low energy method for conveying ice lumps.

Preferably, only one batch of ice lumps is in the conveying conduit means at any one time and the conveying medium is supplied to the conveying conduit means at the upstream end thereof.

The advantage of this feature of the invention is that it provides a particularly efficient method for conveying ice lumps.

Further, the invention provides a method for cleaning a conveying conduit means, the method comprising the steps of:

delivering a cleaning fluid into the conveying conduit means adjacent one end thereof, and supplying a conveying medium to the conveying conduit means for conveying the cleaning fluid through the conveying conduit means.

The advantage of this aspect of the invention is that it provides a relatively efficient method for cleaning a conveying conduit means. In particular, where the method is used for cleaning a conveying conduit means used in conveying batches of ice lumps, an effective method for cleaning the conveying conduit means is provided. Where the method for cleaning uses a disinfectant or a sanitization fluid, the method is also suitable for disinfecting or sanitising the conveying conduit means.

In one embodiment of the invention, the method further comprises the step of delivering a body member into the conveying conduit means for dispersing the cleaning fluid over the inner surface of the conveying conduit means, the body member being delivered into the conveying conduit means at the same end as the cleaning fluid prior to supplying the conveying medium to the conveying conduit means.

The advantage of this feature of the invention is that the action of the body member co-operating with the cleaning fluid causes the cleaning fluid to disperse more effectively and efficiently over the inner surface of the conveying conduit means.

In one embodiment of the invention, the body member is a resilient member.

The advantage of this feature of the invention is that good dispersion of the cleaning fluid over the inner surface of the conveying means is provided, and the feeding of the body member from the ice lump source into the conveying conduit means is facilitated.

In another embodiment of the invention, the body member is of cross section substantially corresponding to the cross section of the conveying conduit means, and being of size less than the cross section of the conveying conduit means.

The advantage of this feature of the invention is that further improvement in the dispersion of the cleaning fluid over the inner surface of the conveying conduit means is achieved.

Advantageously, the cleaning fluid is a liquid and the conveying medium is supplied at the same end of the conveying conduit means as the cleaning fluid.

The advantage of this feature of the invention is that adequate cleaning is provided for.

Additionally, the invention provides a method for drying a conveying conduit means for conveying batches of ice lumps, the method comprising the steps of supplying a drying medium to the conveying conduit means at a predetermined interval after the last batch of ice lumps has been delivered through the conveying conduit means.

The advantage of this aspect of the invention is that it provides a relatively efficient method for drying the conveying conduit means in the event that a period of time elapses between batches of ice lumps being conveyed through the conveying conduit means.

Preferably, the drying medium is delivered through the conveying conduit means for a predetermined period of time.

The advantage of this feature of the invention is that better control of the drying of the conveying conduit means is achieved.

Preferably, the drying medium is provided by the conveying medium, and is derived from the conveying medium source.

The advantage of this feature of the invention is that it provides a relatively efficient and effective, as well as a low cost method for drying a conveying conduit means.

Additionally, the invention provides conveying apparatus for conveying ice lumps from an ice lump source to a remote location, the conveying apparatus comprising:

conveying conduit means for conveying the ice lumps from the ice lump source to the remote location, the conveying conduit means having an upstream end and a downstream end, connecting means for connecting the upstream end of the conveying conduit means to the ice lump source, communicating means for communicating the conveying conduit means with a conveying medium source for conveying the ice lumps through the conveying conduit means, and means for alternately supplying a batch of ice lumps and conveying medium to the conveying conduit means so that on the batch of ice lumps being delivered into the conveying conduit means, the conveying medium is then supplied into the conveying conduit means.

The advantages of the conveying apparatus according to the invention are many. In particular, it has been found that the conveying apparatus enables ice lumps to be conveyed over a relatively long distance with relatively low energy requirements. Further, the noise level generated by the conveying apparatus is relatively low. Additionally, ice lumps can be conveyed over relatively long distances with minimal deterioration to the ice lumps. It has been found that the ice lumps by being conveyed relatively rapidly and at a relatively high efficiency, reduces the amount of melting caused to the ice lumps to a minimum. Indeed, it has been found that by using the method and apparatus of the invention, the quantity of conveying medium required is minimised, thereby considerably reducing any danger of deterioration of ice lumps caused by melting.

In one embodiment of the invention, metering means are provided for metering the ice lumps in batches into the conveying conduit means.

The advantage of this feature of the invention is that the ice lumps are delivered into the conveying conduit means in a controlled manner.

In another embodiment of the invention, the metering means comprises a metering valve.

The advantage of this feature of the invention is that a relatively efficient, low cost and relatively maintenance free metering means is provided.

In another embodiment of the invention, timer means is provided for operating the metering means for a predetermined period of time for delivering a batch of ice lumps of predetermined size.

The advantage of this feature of the invention is that the batch size of each batch of ice lumps is tightly controlled.

In another embodiment of the invention, the communicating means communicates the upstream end of the conveying conduit means with the conveying medium source.

The advantage of this feature of the invention is that it provides for a relatively efficient and cost effective construction of apparatus. It also provides for an efficient running apparatus.

In one embodiment of the invention, the means for alternately supplying a batch of ice lumps and conveying medium to the conveying conduit means comprises a main valve means, the main valve means being alternately operable into an ice delivery position communicating the conveying conduit means with the ice lump source, and a conveying medium supply position communicating the conveying conduit means with the conveying medium source.

The advantage of this feature of the invention is that it provides a relatively efficient conveying apparatus and also a relatively convenient construction of apparatus which requires minimum onsite maintenance.

In a further embodiment of the invention, the main valve means in the conveying medium supply position isolates the conveying conduit means from the ice lump source.

The advantage of this feature of the invention is that it minimises the possibility of deterioration of ice lumps at the ice lump source.

In another embodiment of the invention, the main valve means is connected to the upstream end of the conveying conduit means, and to the connecting means, and to the communicating means.

The advantage of this feature of the invention is that it provides a relatively convenient construction of apparatus.

In another embodiment of the invention, monitoring means is provided for monitoring when a batch of ice lumps has been conveyed to a remote location.

The advantage of this feature of the invention is that the arrival of a batch of ice lumps at a remote location can relatively efficiently be determined.

Preferably, the monitoring means comprises a pressure sensor for monitoring back pressure in the conveying conduit means. The advantage of this feature of the invention is that it provides a relatively simple means of determining when a batch of ice lumps has arrived at a remote location.

In another embodiment of the invention, the means for alternately supplying a batch of ice lumps and conveying medium is responsive to the monitoring means detecting delivery of a batch of ice lumps so that on delivery of a batch of ice lumps, the means for alternately supplying a batch of ice lumps and conveying medium supplies the next batch of ice lumps to the conveying conduit means.

The advantage of this feature of the invention is that it further improves the efficiency of the conveying apparatus.

Preferably, the connecting means extends downwardly from the ice lump source to facilitate delivery of batches of ice lumps to the conveying conduit means under gravity.

The advantage of this feature of the invention is that it provides a relatively simple construction of apparatus which is cost effective to manufacture and to run. Furthermore, this feature also leads to an apparatus with an improved efficiency.

In another embodiment of the invention, portion of the conveying conduit means adjacent the upstream end and extending therefrom extends downwardly from the connecting means to facilitate delivery of batches of ice lumps into the conveying conduit means under gravity.

This feature of the invention further improves the efficiency of the apparatus.

In a further embodiment of the invention, the conveying apparatus conveys batches of ice lumps from the ice lump source to a plurality of remote locations, the remote locations being connected to the ice lump source by respective conveying conduit means of a plurality of conveying conduit means.

The advantage of this feature of the invention is that it provides a conveying apparatus which effectively and efficiently conveys batches of ice lumps from an ice lump source to a plurality of remote locations.

In another embodiment of the invention, each conveying conduit means is connected to the ice lump source by a corresponding means for alternately supplying a batch of ice lumps and conveying medium into the conveying conduit means.

The advantage of this feature of the invention is that it provides a relatively effective and efficient, and low cost apparatus.

In another embodiment of the invention, the conveying conduit means conveys batches of ice lumps from the ice lump source to a plurality of remote locations, the conveying conduit means comprising a main conveying conduit means and a plurality of secondary conveying conduit means connected to the main conveying conduit means, the main conveying conduit means extending from the ice lump source, and the secondary conveying conduit means terminating at respective remote locations.

The advantage of this feature of the invention is that it likewise provides an apparatus which is efficient and effective to run.

Preferably, each secondary conveying conduit means is connected to the main conveying conduit means by a diverter valve means for alternately connecting the upstream end of the main conveying conduit means with the secondary conveying conduit means and a portion of the main conveying conduit means downstream of the diverter valve means.

The advantage of this feature of the invention is that it permits batches of ice lumps to be efficiently diverted to respective remote locations.

In one embodiment of the invention, means for sequentially polling the remote locations to determine if a demand for ice lumps exists at the remote location, the means for alternately supplying a batch of ice lumps and conveying medium into the conveying conduit means being responsive to the polling means.

The advantage of this aspect of the invention is that it provides a relatively efficient method of operating the apparatus.

In a further embodiment of the invention, the communicating means extends round the ice lump source to form heat exchange means for cooling the conveying medium.

The advantage of this feature of the invention is that it further reduces any danger of deterioration of ice lumps during conveying in that the temperature of the conveying medium is reduced on passing through the heat exchange means.

In a further embodiment of the invention, a buffer storage means is provided for storing ice lumps, the buffer storage means being connected to the means for alternately supplying a batch of ice lumps and conveying medium to the conveying conduit means, for conveying ice lumps from the ice lump source to the buffer storage means, and delivery means being provided from the buffer storage means for delivering ice lumps from the buffer storage means to the ice lump source.

The advantage of this feature of the invention is that it permits relatively large quantities of ice lumps to be stored during periods when the demand for ice is relatively low, and the stored ice lumps are then available for use during peak periods of demand.

Additionally, the invention provides conveying apparatus for conveying ice lumps from an ice lump source to a remote location, the conveying apparatus comprising:

conveying conduit means for conveying the ice lumps from the ice lump source to the remote location, the conveying conduit means having an upstream end and a downstream end, connecting means for connecting the upstream end of the conveying conduit means to the ice lump source, communicating means for communicating the conveying conduit means with a conveying medium source for conveying the ice lumps through the conveying conduit means, and means for intermittently delivering batches of ice lumps from the ice lump source to the conveying conduit means.

The advantages of this aspect of the invention are many. The conveying apparatus of this aspect of the invention conveys ice lumps in an efficient manner over relatively long distances and with minimum deterioration of the ice lumps.

In one embodiment of the invention, the intermittent delivery means delivers the next batch of ice lumps into the conveying conduit means on the previous batch of ice lumps being conveyed to the remote location.

The advantage of this feature of the invention is that it provides a relatively efficient apparatus.

In another embodiment of the invention, ice lumps are delivered into the conveying conduit means adjacent a venturi or a nozzle, the conveying medium being conveyed through the venturi or nozzle for drawing the ice lumps of a batch of ice lumps into the conveying conduit means.

The advantage of this feature of the invention is that the efficiency with which ice lumps are delivered into the conveying conduit means is considerably improved, and furthermore, the risk of back pressure causing conveying medium to reach the ice lump source is reduced, thereby minimising any risk of deterioration of ice lumps in the ice lump source. While the size, in other words, the weight of each batch of ice lumps may vary from conveying apparatus to conveying apparatus, the weight of a batch of ice lumps will depend on a number of variables. For example, the weight of a batch of ice lumps will be dependent on the cross sectional area of the conveying conduit means. The weight will also be dependent on the shape of the cross section of the conveying conduit means, as well as the length of the conveying conduit means, and the way the conveying conduit means is laid. For example, if the conveying conduit means is provided in a relatively level run, the weight of each batch of ice lumps would, preferably, be smaller than if the conveying conduit means which had a number of vertical drop portions through which the batches of ice lumps were dropped. Needless to say, a sloping conveying conduit means would accommodate a batch of ice lumps of weight lying between the weight which could be efficiently carried by a substantially level conveying conduit means or a conveying conduit means with a number of vertical drop portions. Additionally, the size and capacity of the conveying medium source and the energy of the conveying medium source will also play a part in determining the weight of a batch of ice lumps for efficient operation of the conveying apparatus. However, it is believed that, in general, the weight of a batch of ice lumps should not exceed 10 grammes of ice lumps for each one square millimeter of cross sectional area of conveying conduit means. While this figure is given as a guide to the upper value of a batch size, it is not intended to in any way limit the invention or the scope of the claims. In general, it is believed preferable that the weight of a batch of ice lumps should not exceed 5 grammes of ice lumps for each square millimeter of cross sectional area of conveying conduit means. More normally, it is envisaged that the weight of a batch of ice lumps would be of the order of 1 to 2 grammes of ice lumps for each square millimeter of cross sectional area of conveying conduit means. A recommended normal batch size of ice lumps for a conveying conduit means of circular cross section of 50 millimeters diameter would be 2 Kg batch size based on the ratio of one gramme of ice for each square millimeter of cross sectional area of conveying conduit means.

The advantage of maintaining the weight of a batch of ice lumps within the values given above is that, in general, the conveying apparatus functions relatively efficiently and with minimum amount of risk of melting of the ice lumps.

Further, the invention provides a holding device for temporarily holding ice lumps prior to being delivered into a secondary storage means of an ice lump conveying apparatus, the holding device comprising a holding container having an inlet for receiving the ice lumps and an outlet through which the ice lumps are delivered into the secondary storage means, valve means mounted in the outlet for selectively closing the outlet, exhaust means being provided from the holding container for exhausting conveying medium therefrom, and drain means being provided from the holding container for draining water therefrom.

The advantage of this aspect of the invention is that the use of the holding device permits a batch of ice lumps to be held remote of a secondary storage means until the conveying medium has been exhausted prior to the batch of ice lumps being delivered into the secondary storage means. This thus minimises the risk of deterioration of ice lumps caused by melting in the storage means, which could otherwise be affected by the conveying medium.

In a further embodiment of the invention, the holding container comprises a side wall diverging outwardly downwardly towards the outlet.

The advantage of this feature of the invention is that it minimises the risk of bridging of ice lumps in the holding container.

In another embodiment of the invention, the outlet from the holding container is downwardly directed.

The advantage of this feature of the invention is that it provides a relatively efficient construction of holding device.

In a further embodiment of the invention, the valve means comprises a flap valve, the flap valve being adapted for monitoring the level of ice lumps in the secondary storage means.

The advantage of this feature of the invention is that it provides a relatively low cost, while at the same time effective means for monitoring the level of ice lumps in the secondary storage means and particularly the maximum level.

Further, the invention provides metering apparatus for metering a metered quantity of ice lumps through a dispensing outlet of ice lump conveying apparatus, the metering apparatus comprising a metering chamber for collecting the metered quantity of ice lumps, the metering chamber having an inlet through which ice lumps are delivered into the metering chamber and an outlet through which the metered quantity of ice lumps are delivered from the metering chamber, first and second valve means being provided in the inlet and outlet, respectively, for selectively opening the inlet and outlet for collecting and dispensing the metered quantity of ice lumps, a dispensing tube extending from the outlet of the metering chamber to a dispensing outlet, a third valve means being provided in the dispensing tube adjacent the dispensing outlet for retaining a metered quantity of ice lumps from the metering chamber prior to being delivered through the dispensing outlet.

The advantage of this aspect of the invention is that it provides relatively efficient apparatus for dispensing predetermined quantities of ice, and this has a particular advantage where the ice lumps are being dispensed directly into a beverage glass.

Furthermore, the invention provides a separator for separating ice lumps from a conveying medium, the separator comprising a housing defining a hollow interior region, an inlet being provided to the hollow interior region for delivering ice lumps and conveying medium into the interior region, a diverting means extending transversely across the interior region for engaging and diverting ice lumps from the interior region, an exhaust means from the interior region for exhausting conveying medium, and a drain means for draining water from the interior region.

The advantage of this feature of the invention is that it provides a relatively efficient means of separating ice lumps from the conveying medium, and this has a particular advantage where the ice lumps are being delivered directly into a storage bin at a remote location. By using the separator, the conveying medium is directed away from the storage bin, thereby minimising the risk of deterioration of the ice lumps which might otherwise be caused as a result of conveying medium being blown onto the ice lumps in the storage bin.

Advantageously, the separator comprises damping means for slowing down the ice lumps.

The advantage of this feature of the invention is that the ice lumps are slowed down before being conveyed into a bin, dispenser or the like at a remote location, thereby minimising the damage to the ice lumps being conveyed or ice lumps in the storage bin or dispenser at the remote location. A further advantage of this feature of the invention is that the separator operates relatively silently.

Additionally, the invention provides a diverter valve comprising a housing defining a hollow interior region, three ports being provided, and a valving member slidably mounted in the interior region of the housing and being slidable laterally from a first position towards one lateral end of the housing to a second position towards a second lateral end of the housing, at least one of the said ports being provided in the valving member so that the said one port is alternately communicable with the other ports as the valving member is moved into the first and the second positions.

The advantage of this aspect of the invention is that it provides a relatively efficient, effective and also a relatively maintenance free diverter valve. Another advantage of the diverter valve according to the invention is that the diverter valve can be readily easily manufactured and produced at relatively low cost.

Advantageously, an outlet is provided from the interior region for providing access by the said at least one port in the valving member.

The advantage of this feature of the invention is that it provides a relatively simple construction of diverter valve.

In a further embodiment of the invention, a duct means is provided connecting the said one lateral end with the said other lateral end, and a flowable disinfectant material is packed in the interior region, and the disinfectant material is transferred between alternate said one and other lateral ends of the interior region of the housing as the valving member is moved from one position to the other. Preferably, the disinfectant material is pressurised and advantageously, the disinfectant material is grease.

The advantage of these features of the invention is that it provides a relatively hygienic diverter valve, which, in general, avoids the ingress of bacteria, microbes and other foreign matter into the conveying conduit.

The invention will be more clearly understood from the following description of some preferred embodiments thereof, which are given by way of example only, with reference to the accompanying drawings.

BRIEF DESCRIPTION OF THE DRAWINGS

FIG. 2 is a cut-away perspective view of portion of the apparatus of FIG. 1, FIG. 3 is a plan view of the portion of the apparatus of FIG. 2, FIG. 10 is a perspective view of portion of the apparatus of FIG. 9, FIG. 11 is a cut-away perspective view of the portion of FIG. 10, FIG. 23 is a perspective view of a dispenser according to the invention for use in any of the conveying apparatus also according to the invention, FIG. 24 is a sectional side elevational view of the dispenser of FIG. 23, FIG. 25 is a perspective view of a separator also according to the invention for use in any of the conveying apparatus, FIG. 26 is a cut-away perspective view of the separator of FIG. 25, FIG. 30 is an underneath perspective view of a separator according to a further embodiment of the invention, FIG. 31 is an underneath plan view of portion of the separator of FIG. 30, FIG. 32 is a sectional side elevational view of the separator of FIG. 30 on the lines XXXII—XXXII of FIG. 31.

DETAILED DESCRIPTION OF THE INVENTION

Figure 1:
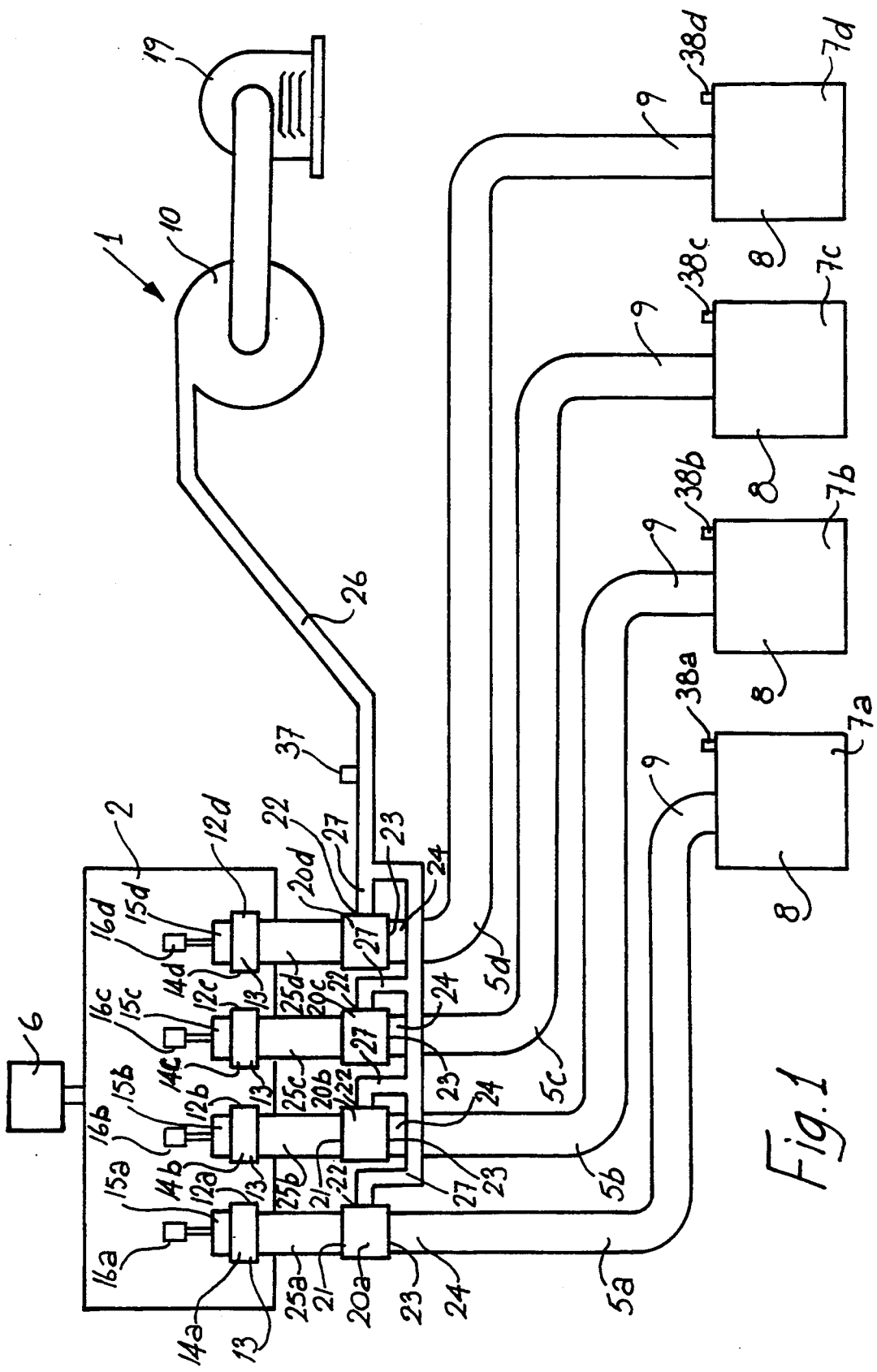
FIG. 1 is a block representation of conveying apparatus according to the invention for conveying ice lumps from an ice lump source to a plurality of remote locations.

Referring to the drawings, and initially to FIGS. 1 to 8 there is illustrated conveying apparatus according to the invention indicated generally by the reference numeral 1 for conveying lumps of ice, typically ice lumps which are normally referred to as ice cubes for cooling beverages or the like. However, the ice lumps may be of any desired shape, cubic, cylindrical, regular shape, irregular shape or the like. The apparatus 1 conveys the ice lumps in discrete batches from an ice source at a central location to any one of a plurality of remote locations. The remote locations may be remote from each other and may be a considerable distance from each other, as well as being a considerable distance from the central location on the one hand. However, on the other hand, some or all of the remote locations may be relatively close to the central location. Typically, the apparatus 1 is particularly suitable for conveying ice lumps from a central ice making location, for example, on the top floor of a hotel or the like, to remote locations, for example, on different floors of the hotel. Alternatively, the apparatus may, for example, be mounted in a bar or restaurant or other premises and may convey ice lumps from a central ice making location within the bar to a plurality of dispensers, also within the bar or premises.

Referring to FIGS. 1 to 8, the apparatus 1 comprises an ice lump source, in this embodiment of the invention, a main storage means, namely, a main storage hopper 2 for storing ice lumps which is located at the central location. Batches of ice lumps are conveyed from the main storage hopper 2 through a plurality of conveying conduit means, namely, four main conveying conduits 5a, 5b, 5c and 5d to a plurality of secondary storage means, namely, four corresponding dispensers 7a, 7b, 7c and 7d located at four respective remote locations.

Each main conduit 5 extends from an upstream end 24 to a downstream end 9 which is connected to a corresponding dispenser 7. For convenience, the main storage hopper 2 and the dispensers 7 are illustrated in block representation in FIG. 1, however, both are described in more detail below. Each dispenser 7 comprises a hopper 8 for receiving the batches of ice lumps from the corresponding main conduit 5. A conveying medium is supplied to the main conduits 5 as will be described below from a conveying medium source for conveying batches of ice lumps through the main conduits 5 to the corresponding dispensers 7. In this embodiment of the invention, the conveying medium is air, which is derived from a pressure source, in this case, an air blower 10 which supplies conveying air to the main conduits 5 at a pressure in the range of 0.1 bar to 0.8 bar. The blower 10 is driven by an electrically powered motor 19, the operation of which is controlled by a control circuit 18 illustrated in FIG. 5 and described below.

The main storage hopper 2 may be any one of a number of ice storage hoppers which will be well known to those skilled in the art. Such storage hoppers, in general, would typically comprise an agitating means mounted within the hopper to prevent fusing or bridging of the ice lumps, and would also comprise a discharge means mounted within the hopper for discharging ice lumps from the hopper 2. In this embodiment of the invention, the main storage hopper 2 is of circular horizontal cross section and comprises rotatable discharge paddles 4 mounted within the hopper adjacent the base thereof for urging ice lumps through a plurality of outlets 12, in this case, four outlets 12a, 12b, 12c and 12d. An electrically powered motor 6 controlled by the control circuit 18 drives the rotatable discharge paddles 4. An ice maker (not shown) which will be well known to those skilled in the art delivers ice lumps into the main storage hopper 2. Metering means for metering batches of ice lumps through the hopper outlets 12 comprise metering valves 14a to d mounted adjacent respective hopper outlets 12a to d. Each metering valve 14 is a gate valve comprising a housing 13. A closure plate 15 is slidable in the housing 13 from a closed position closing the outlet 12 to an open position opening the outlet 12. Solenoids 16a to d mounted on the main storage tank 2 adjacent the outlets 12 are connected to respective closure plates 15a to d for operating the closure plates 15. A timer 17 in the control 18 controls the length of time the respective closure plates 15 are open for determining the size of each batch of ice lumps. In this embodiment of the invention, the timer 17 is set to meter batches of ice lumps through the outlets 12 of weight 2.25 Kg.

Figure 4:
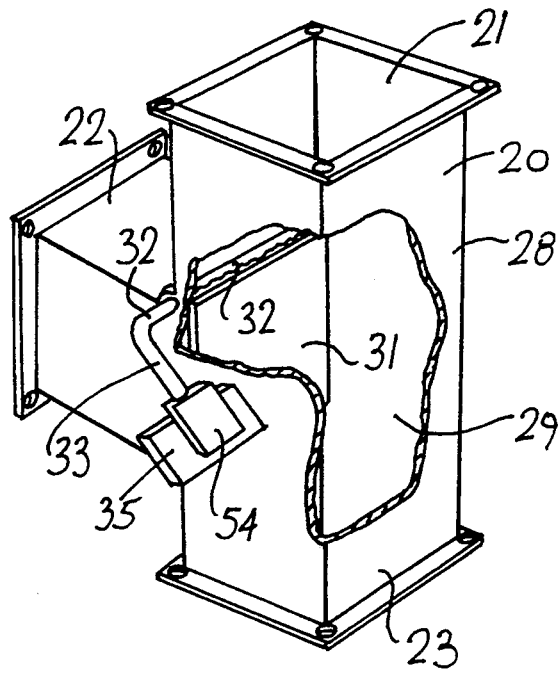
FIG. 4 is a cut-away perspective view of a detail of the apparatus of FIG. 1.
Figure 5:
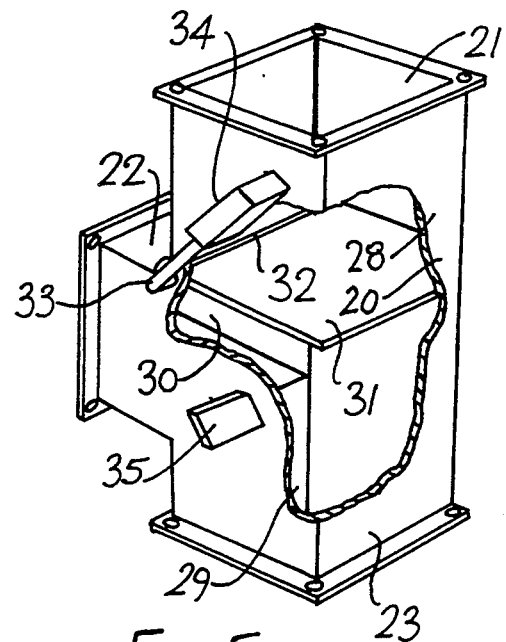
FIG. 5 is a cut-away perspective view of the detail of FIG. 4 in a different position.

Means for alternately supplying a batch of ice lumps and conveying medium into the main conduits 5 comprise main valve means, namely, four main valves 20a, 20b, 20c and 20d, each having three ports, namely, two inlet ports 21 and 22 and an outlet port 23. The means for alternately supplying a batch of ice lumps and conveying medium into the main conduit 5 also, in this embodiment of the invention, comprises the control circuit 18 which switches on and off the motor 19 of the blower 10 as will be described below. The outlet port 23 of each main valve 20a, 20b, 20c and 20d is connected to its corresponding main conduit 5a, 5b, 5c and 5d, respectively, at an upstream end 24 of the respective main conduit 5. The inlet port 21 of each valve 20 is connected to a corresponding outlet 12 by connecting means, in this case, a connecting conduit 25. The inlet port 22 of each main valve 20 is connected to the blower 10 through communicating means, namely, a communicating conduit 26 which extends from the blower 10 and branch conduits 27 connecting the communicating conduit 26 with respective inlet ports 22. Each main valve 20 is a flap valve which is illustrated in FIGS. 4 and 5 and comprises a housing 28 which defines bores 29 and 30 of square cross section which communicate the outlet port 23 with the inlet ports 21 and 22, respectively. A valving flap 31 extends from and is rigidly mounted on a pivot shaft 32 which is pivotally mounted in the housing 28 adjacent the junction of the bores 29 and 30. The valving flap 31 is pivotal from an ice delivery position illustrated in FIG. 4 to a conveying medium supply position illustrated in FIG. 5. In the ice delivery position, the outlet port 23 and inlet port 21 communicate for communicating the corresponding main conduit 5 with the metering valve 14 for delivering a batch of ice lumps into the main conduit 5. In the air supply position, the outlet port 23 communicates with the inlet port 22 for communicating the conduit 5 with the blower 10 for supplying conveying medium into the main conduit 5. When the valving flap 31 is in the ice delivery position illustrated in FIG. 4, the valving flap 31 closes the bore 30, thereby isolating the conveying conduit 5 from the conveying air supply from the blower 10. When the valving flap 31 is in the air delivery position illustrated in FIG. 5 the valving flap 31 isolates the inlet port 21, thereby preventing back flow of conveying air through the connecting conduit 25.

An arm 33 extending from the pivot shaft 32 of each main valve 20 carries means for switching the main valve 20 from the conveying medium supply position to the ice delivery position. The said means comprises a counter weight 34 mounted on the arm 33 for urging the valving flap 31 into the ice delivery position of FIG. 4. Retaining means for retaining the valving flap 31 in the ice delivery position of FIG. 4 comprises an electromagnet 35 mounted on the housing 28 which on being energized acts on the counter weight 34 for retaining the valving flap 31 in the ice delivery position against the pressure of the conveying air from the blower 10, thereby isolating the main conduit 5 from the blower 10. The weight of the counter weight is so chosen that the pressure of the conveying air from the blower 10 is sufficient to overcome the weight of the counter weight 34 for pivoting the valving flap 31 into the conveying air supply position illustrated in FIG. 5 when the electromagnet 35 is de-energised. In this embodiment of the invention, the weight of the counter weight is 200 grammes which provides a turning moment on the pivot shaft of approximately 10 gramme meters. Accordingly, the action of the conveying air at between 0.1 bar and 0.8 bar acting on the valving flap 31 has been found to be sufficient to overcome the turning moment provided by the counter weight.

On a supply of conveying air being required for conveying a batch of ice lumps through the main conduit 5, the electromagnet 35 of the main valve 20 corresponding to the conduit 5 through which the batch of ice lumps is to be conveyed is de-energised, while the electromagnets 35 of the other main valves 20 remain energised. Under the control of the control circuit 18 described below, the motor 19 is powered to drive the blower 10 which supplies conveying air to the main valves 20. The valving flap 31 of the main valve 20, the electromagnet 35 of which has been de-energised, is pivoted into the air supply position by the conveying air and conveying air is delivered into the main conduit 5 until the batch of ice lumps has been conveyed to the corresponding dispenser 7, as will be described in more detail below. On the batch of ice lumps having been conveyed to the dispenser 7, the control circuit switches off power to the motor 19, thereby de-activating the blower 10 and the valving flap 31 of the main valve 20 which had been in the air supply position pivots under the weight of the counter weight into the ice delivery position. The electromagnet 35 is energised, thereby retaining the valving flap 31 in the ice delivery position.

Each connecting conduit 25 extends downwardly from the corresponding hopper outlet 12 to the corresponding main valve 20 to facilitate delivery of batches of ice lumps from the hopper outlets 12 into the main conduit 5 under gravity. Furthermore, a portion 36 of each main conduit 5 adjacent the upstream end 24 extends downwardly from the corresponding main valve 20 likewise to facilitate delivery of the batches of ice lumps into the main conduit 5.

In this embodiment of the invention, the main conduit 5 is of plastics material and of circular cross section of approximately 50 mm internal diameter. It has been found that a conduit of internal diameter of 50 mm is particularly suitable for conveying batches of ice lumps in which the ice lumps have a maximum dimension of approximately 30 mm. The connecting conduit 25 is illustrated as being of square cross section, although if desired the cross section of the connecting conduit 25 may be circular and also of 50 mm, or of other cross section. Where the connecting conduit 25 is provided of square cross section, it is preferable that the internal dimensions of the cross section should be 50 mm by 50 mm. The bores 29 and 30 and the ports of each main valve 21, 22 and 23 are also of square cross section and are 50 mm by 50 mm cross section. Needless to say, the cross section of the bores and ports of the main valve may be of any other desired size and shape. Indeed, in certain cases, it is envisaged that the cross section of the bores of the main valves may be partly square and partly circular, for example, a D-shaped cross section.

Monitoring means for determining when a batch of ice lumps has been conveyed to a dispenser 7 at a remote location comprises an air pressure sensor 37 mounted on the communicating conduit 26 for monitoring the air pressure of the conveying air in the communicating conduit 26. It has been found that on a batch of ice lumps being delivered to a dispenser 7, the back pressure in the communicating conduit 26 drops. Sensing means comprising level sensors 38 illustrated in block representation in FIGS. 1 and 6 are provided in respective dispensers 7 for monitoring the level of ice lumps in each dispenser 7.

Figure 6:
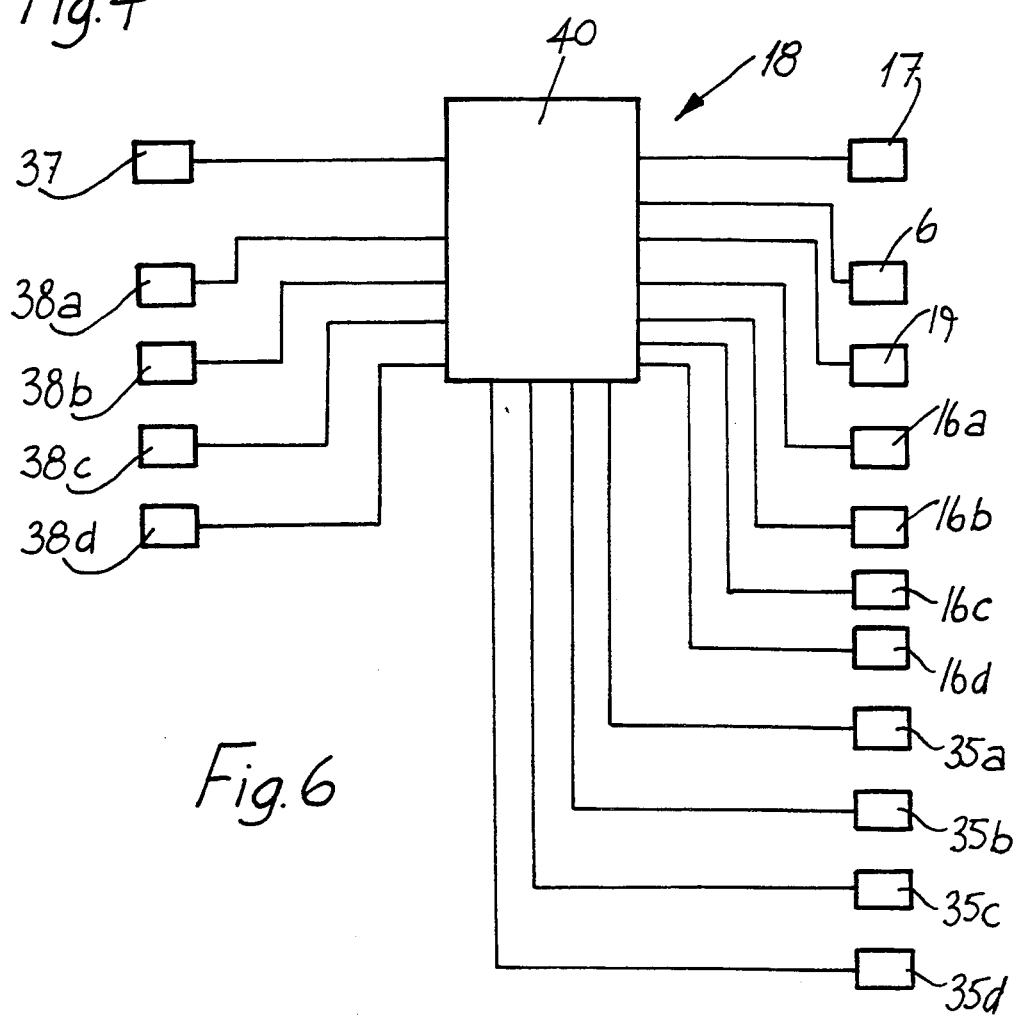
FIG. 6 is a block representation of a control circuit of the apparatus of FIG. 1.

Referring to FIG. 6, the control circuit 18 for controlling the apparatus 1 is illustrated in block representation. A central processing unit 40 controls the circuit 18 and the operation of the apparatus 1. The timer 17 is controlled and read by the central processing unit 40. Means for varying the set time of the timer 17 for varying the batch size of the batches of ice lumps is provided, although these are not shown. Such means for varying the set time will be well known to those skilled in the art. The motor 6 for driving the discharge paddles 4 of the main storage hopper 2 and the motor 19 for driving the blower 10 are controlled by the central processing unit 40, and the time period for which the motor 6 is on is determined by the timer 17 as will be described below. The solenoids 16 of the metering valves 14 are controlled by the central processing unit 40. The electromagnets 35 of the main valves 20 are controlled by the central processing unit 40. The central processing unit 40 reads the pressure sensor 37 and also the level sensors 38. The central processing unit 40 runs under the control of software which comprises a number of routines for controlling the operation of the apparatus, the two main routines are a polling routine for checking the level of ice lumps in each dispenser 7, and a routine for conveying ice lumps from the main storage hopper 2 in batches to a dispenser 7 requiring ice lumps. A flow chart of the polling routine is illustrated in FIG. 7 and a flow chart of the ice lump conveying routine is illustrated in FIG. 8.

Figure 7:
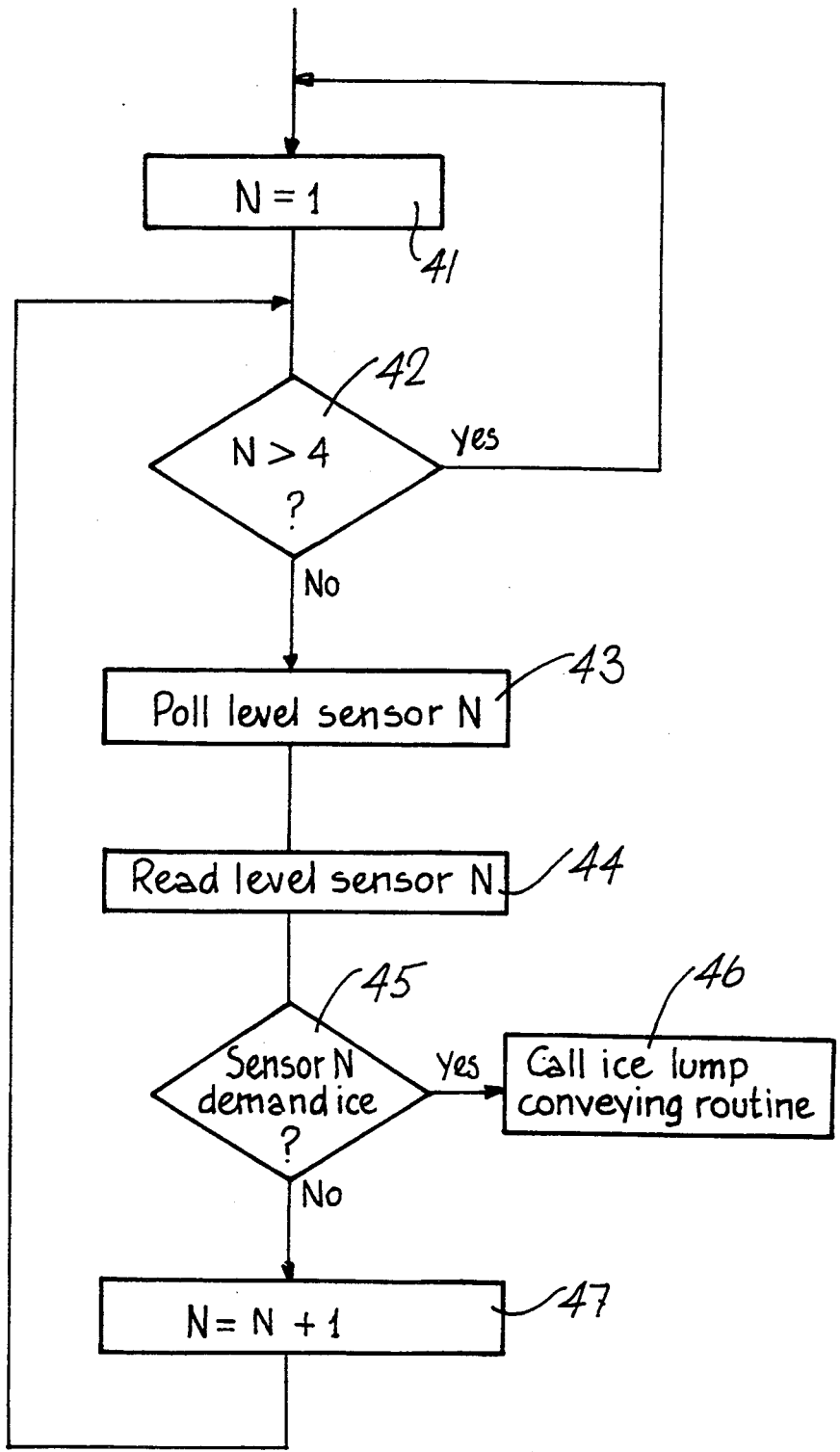
FIG. 7 is a flow chart of a routine of a computer programme for controlling the apparatus of FIG. 1.

Referring to FIG. 7, the routine for polling the level dispensers 38a to d in the dispenser 7a to d comprises the following steps. Block 41 sets N=1, N is an integer from 1 to 4 and represents one of the dispensers 7a to 7d. Dispenser N=1 would be dispenser 7a, dispenser N=2 would be dispenser 7b and so on. Block 42 checks the value of N. If N is greater than 4, the level sensors 38 in all dispensers 7 will have been polled and the routine is returned to block 41 to commence the next polling sequence. If N is not greater than 4, the routine moves on to block 43, which polls level sensor 38 number N. Block 44 reads level sensor 38 number N and the routine moves on to block 45, which checks if level sensor 38 number N is demanding ice. If a demand for ice is determined by block 45, the routine moves on to block 46 which calls up the ice lump conveying routine of FIG. 8. If there is no demand for ice at level sensor 38 number N, the routine moves on to block 47, which increments N by 1 and returns the routine to block 42.

Figure 8:
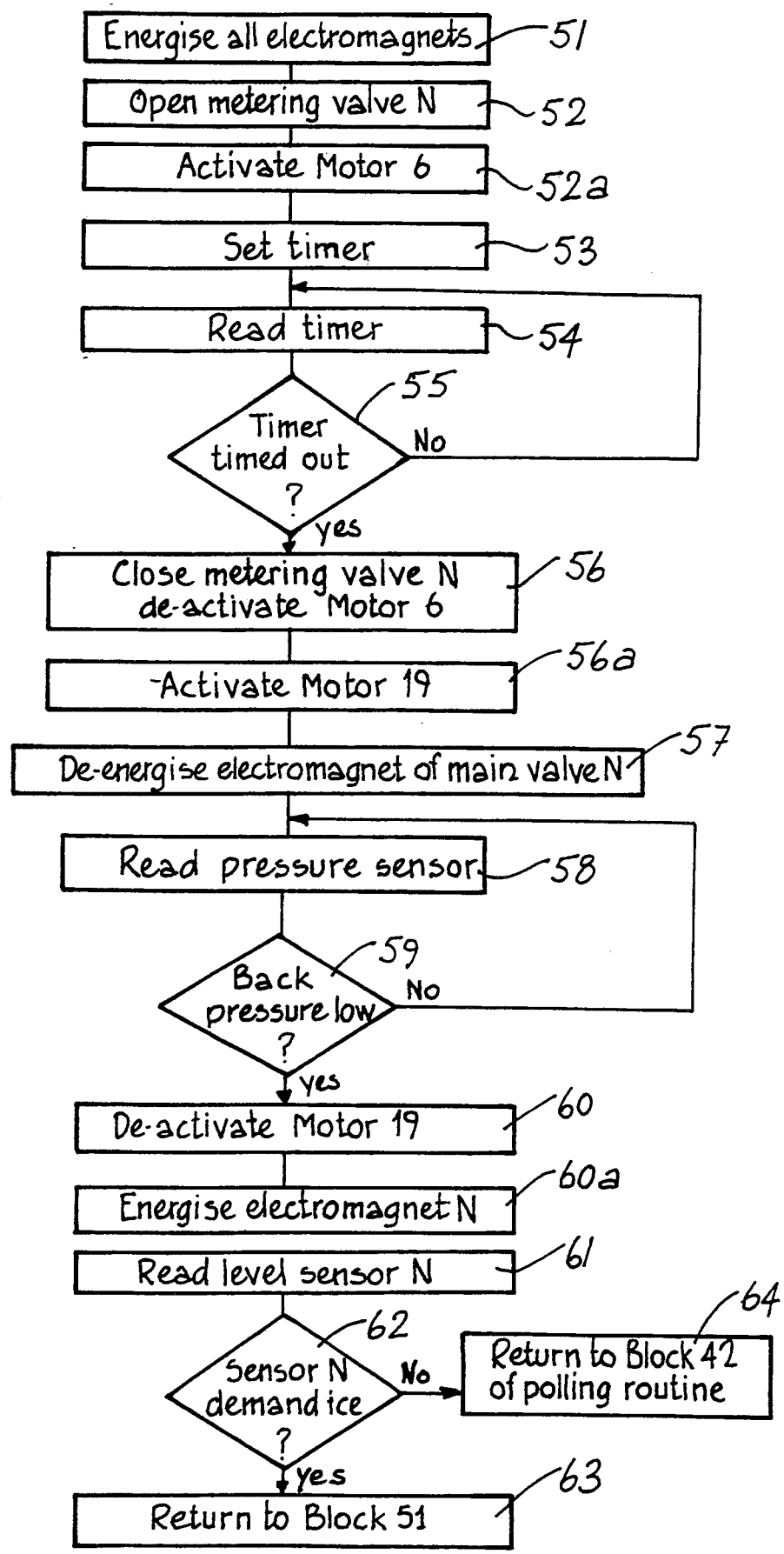
FIG. 8 is a flow chart of a routine of a computer programme for controlling the apparatus of FIG. 1.

Referring now to FIG. 8 the routine for conveying batches of ice lumps through the apparatus 1 will now be described. Block 51 energises all electromagnets 35a to d of the main valves 20a to d, thereby retaining all main valves 20 in the ice delivery position. Block 52 energises the solenoid 16 to open the metering valve 14 number N which corresponds to the dispenser 7 number N, the level sensor 38 number N of which is demanding ice. Block 52a activates the motor 6 to drive the discharge paddles 4 for discharging ice lumps through the outlet 12. Block 53 sets the timer 17 to time a predetermined period of time. The operation of blocks 52, 52a and 53 are carried out simultaneously. Block 54 reads the timer 17 and moves the routine on to block 55 which checks if the timer has timed out. If the timer has not timed out, the routine is returned to block 54 to read the timer again. On the timer having timed out, the routine moves on to block 56, which immediately deactivates the motor 6 and closes the metering valve 14 number N, thereby preventing further delivery of ice lumps into the main conduit 5. At this stage, a batch of ice lumps to be conveyed through the main conduit 5 is now in the portion 36 at the upstream end 24 of the main conduit 5. The routine then moves to block 56a, which activates the motor 19 to drive the blower 10 for supplying conveying air. The routine then moves to block 57, which de-energises the electromagnet 35 of the main valve 20 number N, permitting the pressure of the conveying air to open the valving flap 31 and moving the valving flap 31 into the air supply position (FIG. 4). Air from the blower 10 is delivered through the inlet port 22 of the main valve 20 through the outlet port 23 into the main conduit 5 and conveys the batch of ice lumps through the main conduit 5. The routine then moves on to block 58, which reads the pressure sensor 37 and then moves on to block 59, which checks if the back pressure monitored by the pressure sensor 37 is low. If the back pressure is not low, the routine returns to block 58, which again reads the pressure monitored by the pressure sensor 37. On block 59 determining that the back pressure monitored by the pressure sensor 37 is low, the routine moves on to block 60, which de-activates the motor 19, terminating the supply of conveying air. This permits the counter weight 34 to pivot the valving flap 31 of the valve 20 number N into the ice delivery position. The routine then moves to block 60a, which energises the electromagnet 35 of the main valve 20 number N, thereby retaining the main valve 20 number N in the ice delivery position, and isolating the main conduit 5 from the blower 10. The routine then moves to block 61 which reads the level sensor 38 number N of the dispenser 7 number N and the routine moves on to block 62. Block 62 checks if the level sensor 38 number N is still demanding ice. If block 62 determines that the level sensor 38 is still demanding ice, the routine moves to block 63 which returns the routine to block 51 to commence a further ice conveying cycle to convey another batch of ice to the dispenser 7 number N. If block 62 determines that there is no further demand for ice from level sensor number 38, the routine moves to block 64 which returns the control of the central processing unit to the polling routine of FIG. 6. In this case, block 64 returns control to block 42 in the polling routine.

These routines and other routines are controlled by a main computer programme which deals with other housekeeping functions of the central processing unit 40 and of the apparatus 1. For example, where a predetermined time, for example, one hour, elapses after the last demand for ice has been made from any particular dispenser 7, a routine for drying the main conduit 5 corresponding to that dispenser 7 is called up. The routine for drying the main conduit 5 sets the main valves 20 so that conveying air derived from the blower 10 is delivered through that main conduit 5 for a predetermined period of time for drying the main conduit 5 and so on for the other main conduits 5a to d. In this embodiment of the invention, the conveying air is delivered through the main conduit 5 for approximately ten minutes for drying. Needless to say, the length of the drying time may be varied to suit any particular main conduit, for example, a longer drying time will be provided for a relatively long main conduit, while a shorter drying time will be provided for a relatively short main conduit. Further, where the main conduit does not continuously fall, but rather rises and falls over its length, then the time period for which conveying air is delivered through the main conduit 5 for drying purposes will be relatively longer. Periodically, a cleaning cycle is carried out of the main conduits 5 of the apparatus. The cleaning cycle requires the introduction of a cleaning fluid into the conduits 5 of the apparatus for cleaning the conduits 5 and the main valves 20. Such a cleaning cycle is described in another embodiment of the invention described below with reference to FIGS. 9 to 16.

It will be appreciated by those skilled in the art that due to the method for conveying ice lumps through the main conduits 5 at any one time, only one batch of ice lumps will be in a main conduit 5. Indeed, as described, a single batch of ice lumps only will be in the main conduits 5 at any one time. Although, if desired, in certain cases, it will be appreciated that while each main conduit 5 will only carry a single batch of ice lumps at any one time, each main conduit 5 could carry a single batch of ice lumps simultaneously with one or more of the other main conduits 5. Further, it will be appreciated that in this embodiment of the invention, in an ice conveying cycle a batch of ice lumps is first delivered into the main conduit 5 and the conveying air is then supplied into the main conduit 5 for conveying the batch of ice lumps to the dispenser at the remote location.

In use, ice lumps from the ice maker (not shown) are delivered into and stored in the main storage hopper 2. Initially at start up, the central processing unit under the control of the polling routine of FIG. 7 on finding a demand for ice in the hopper 8 of dispenser 7a, namely, dispenser N=1 calls up the ice conveying routine of FIG. 8 and dispenser number 7a is filled with ice. The polling routine and the ice conveying routine continue until all dispensers 7a to 7d have been supplied with ice. The central processing unit is then returned to the control of the polling routine. On a dispenser 7 requiring ice, the central processing unit 40 under the control of the ice lump conveying routine of FIG. 8 delivers a plurality of batches of ice lumps to the dispenser 7 requiring ice until the dispenser 7 is full.

It is envisaged in some embodiments of the invention that certain dispensers may not be fitted with level sensors. In which case, it is envisaged that the quantity of ice lumps being dispensed from a dispenser at the remote location would be monitored. When it would be determined that the dispenser required ice, a number of batches of ice lumps would be conveyed to the dispenser using the method already described until a predetermined quantity of ice lumps had been conveyed to the dispenser. It is envisaged that in such an arrangement at start up the quantity of ice lumps being conveyed to each dispenser would be sufficient to fill the dispensers up to two-thirds of their capacity. On the monitoring means for monitoring the quantity of ice lumps being dispensed determining that half the quantity of ice lumps had been dispensed, in other words, that the level of ice lumps in the dispenser had dropped to one-third of the capacity of the dispenser, a further quantity of ice lumps would be conveyed to the dispenser in batches, which would again constitute a quantity equal to two-thirds of the capacity of the dispenser. This would then approximately fill the dispenser. Thereafter, on the monitoring means determining that two-thirds of the capacity of the dispenser had been dispensed, a further quantity of ice lumps equivalent to two-thirds of the capacity of the dispenser would be conveyed to the dispenser. In all cases, it is envisaged that a quantity of ice lumps equivalent to two-thirds of the capacity of the dispenser would be made up of a plurality of batches of ice lumps of predetermined size and as already described of approximately 2.25 Kg weight. Although, the weight of a batch size can be varied to suit the type of dispenser 7 to which the batches of ice lumps are being conveyed. It is envisaged that for dispensers having hoppers or bins of relatively small volume, the batch size will be relatively small, while the batch size will be relatively large for dispensers with hoppers or bins of relatively large volume. It is envisaged that the batch size may be varied between 1 Kg and 4 Kg in conveying apparatus, where the main conduit is of 50 mm internal diameter without unduly affecting the efficiency with which the conveying apparatus operates.

As discussed above, other factors besides the size and type of dispenser at the remote location will play a part in determining the batch size of ice lumps for most efficient operation of the conveying apparatus. However, it is envisaged that, in general, the weight of a batch of ice lumps should not exceed 10 grammes of ice lumps for each one square millimeter of cross sectional area of the conveying conduit. Although, in general, it is believed preferable that the weight of a batch of ice lumps should not exceed 5 grammes of ice lumps for each square millimeter of cross sectional area of the conveying conduit means, and more normally, the weight of a batch of ice lumps would not exceed 1 to 2 grammes of ice lumps for each one square millimeter of cross sectional area of conveying conduit means.

Figure 9:
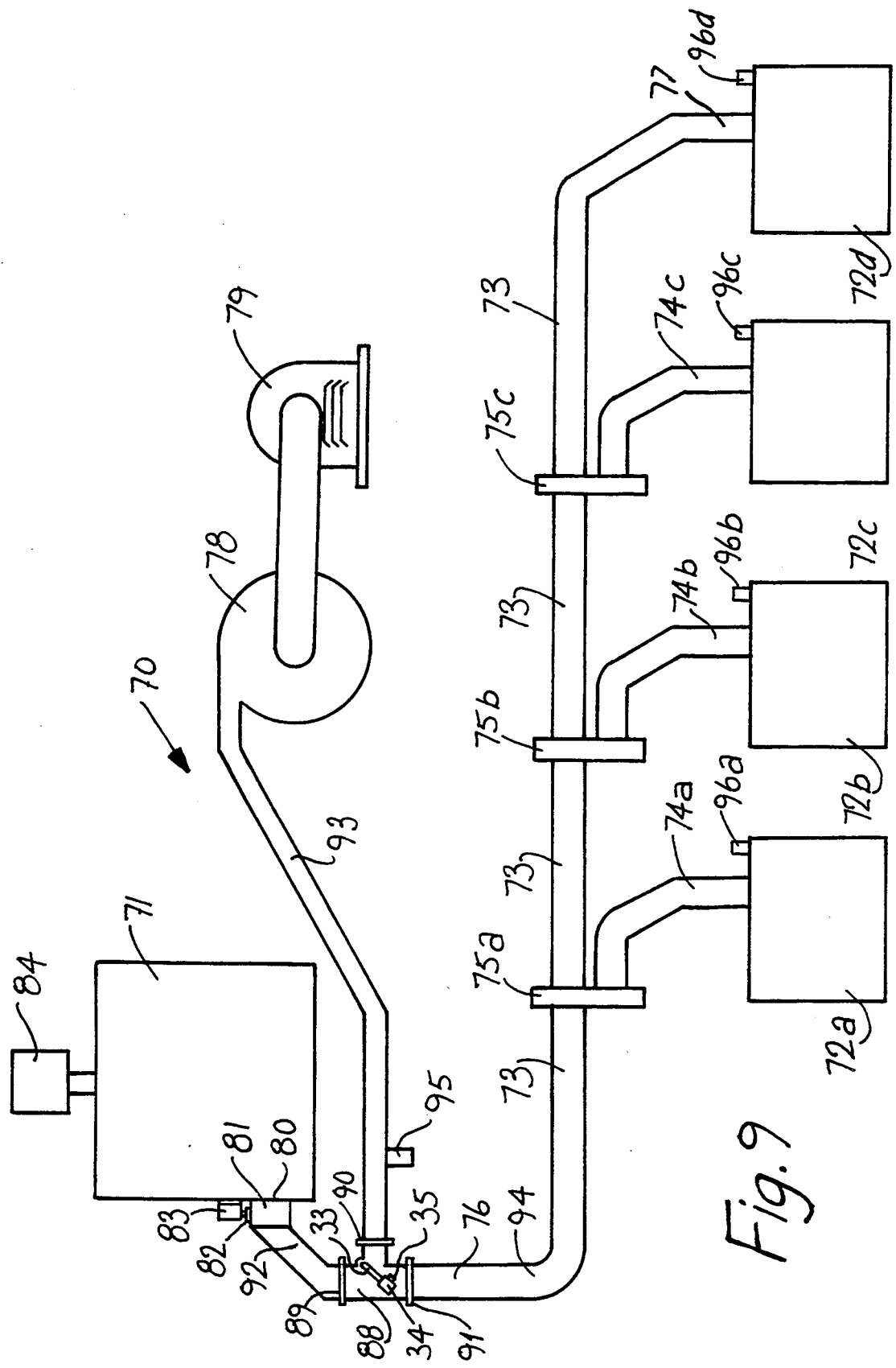
FIG. 9 is a block representation of conveying apparatus according to another embodiment of the invention for conveying ice lumps from an ice lump source to a plurality of remote locations.
Figure 13:
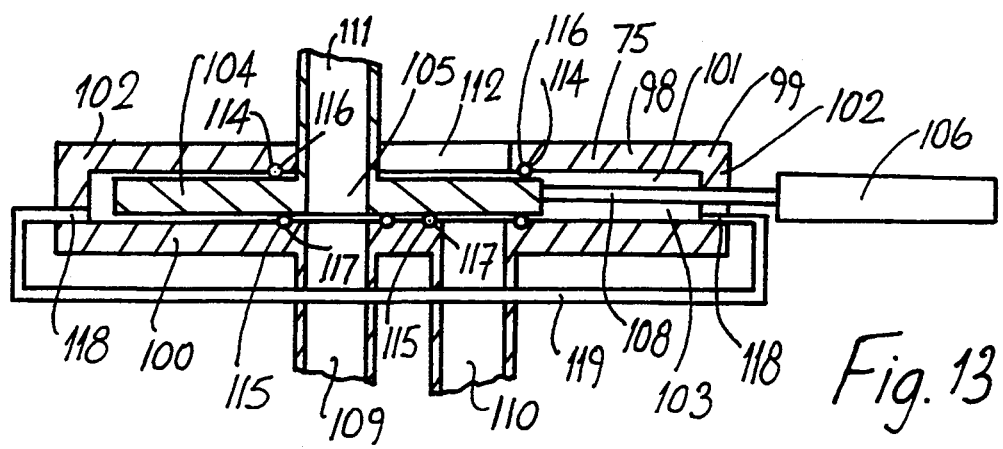
FIG. 13 is a side sectional view of the portion of FIG. 10.
Figure 14:
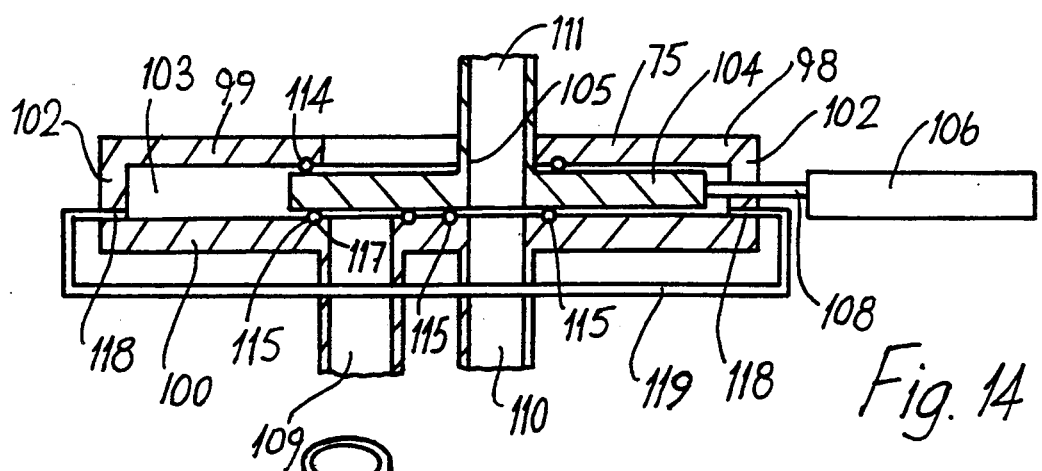
FIG. 14 is a side sectional view similar to the view of FIG. 10 showing the portion in a different position.
Figure 12:
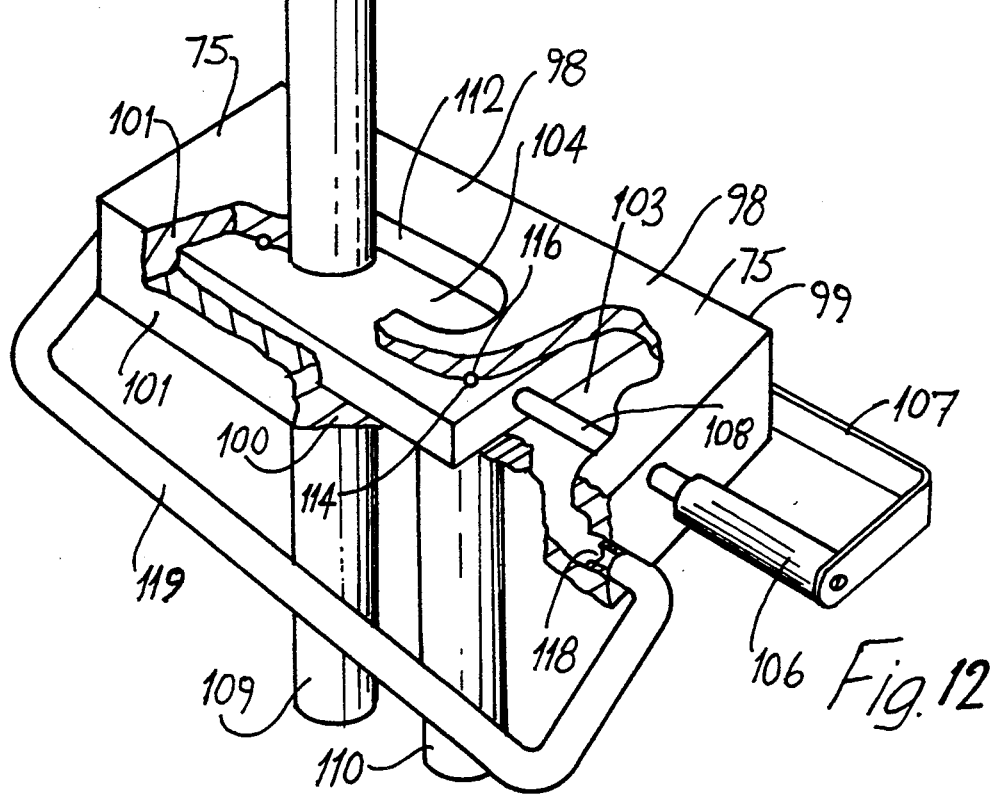
FIG. 12 is another cut-away perspective view of the portion of FIG. 10.

Referring now to FIGS. 9 to 16 there is illustrated conveying apparatus according to another embodiment of the invention indicated generally by the reference numeral 70 for conveying ice lumps in batches from an ice lump source, namely, a main storage hopper 71 to a plurality, in this case, four secondary storage means, namely, dispensers 72a, 72b, 72c and 72d at a plurality of respective remote locations. Conveying conduit means, in this embodiment of the invention, is provided by a main conduit 73 and a plurality, namely, three secondary conduits 74a, 74b and 74c. The secondary conduits 74a, 74b and 74c are connected to, and deliver batches of ice lumps to the dispensers 72a, 72b and 72c, respectively. Batches of ice lumps are delivered to the dispenser 72d by the main conduit 73. The main conduit 73 extends from an upstream end 76 to a downstream end 77 connected to the dispenser 72d. In FIG. 9 the main storage hopper 71 and the dispensers 72 are illustrated in block representation, however, it will be appreciated by those skilled in the art that any suitable main hopper may be used or any suitable dispenser may be used. The main hopper is described in detail below, and A suitable dispenser is described later in the specification. Diverter valve means, namely, diverter valves 75a, 75b and 75c connect the secondary conduits 74a, 74b and 74c, respectively, to the main conduit 5. The diverter valves 75 are described in detail below with reference to FIGS. 10 to 14. Each diverter valve 75 alternately connects the upstream end 76 of the main conduit 73 with a secondary conduit 74 or a portion of the main conduit 73 downstream of the diverter valve 75. Conveying medium, in this case, conveying air is delivered from a conveying medium source, namely, an air blower 78 into the main conduit 73 for conveying batches of ice lumps through the main conduit 73 and the secondary conduits 74. An electrically powered motor 79 drives the air blower 78 under the control of a control circuit 86 which is described below with reference to FIG. 15.

The main storage hopper 71 may be any suitable type of storage hopper which will be well known to those skilled in the art, and typically may comprise agitating means to prevent fusing and bridging of ice lumps in the main storage hopper 71 and also may comprise discharge means for discharging ice lumps from the main storage hopper 71. In this embodiment of the invention, the main storage hopper 71 is substantially similar to the main storage hopper 2 of the conveying apparatus of FIGS. 1 to 8, with the exception that only a single outlet 80 is provided. Discharge paddles (not shown) but similar to the discharge paddles 4 of the main storage hopper 2 of the conveying apparatus of FIGS. 1 to 8 are provided in the main storage hopper 71 for urging ice lumps through the outlet 80. A motor 84 under the control of the control circuit 86 drives the discharge paddles (not shown). A metering valve 81 similar to the metering valves 14 of the apparatus 1 is provided in the hopper outlet 80 for metering batches of ice lumps of predetermined size through the hopper outlet 80 into the main conduit 73 as will be described below. The metering valve 81 comprises a closure plate 82 which is operable by a solenoid 83 mounted on the main storage hopper 71. A timer 85 in the control circuit 86 controls the time period for which the closure plate 82 of the metering valve 81 is open, and the time period for which the motor 84 drives the discharge paddles (not shown) in the main storage hopper 71, thereby determining the batch size of each batch of ice lumps.

Means for alternately delivering a batch of ice lumps and supplying conveying air into the main conduit 73 comprises a main valve 88 similar to the main valve 20 of the apparatus 1, and for convenience, similar components of the main valve 88 to those of the main valves 20 of the apparatus 1 are identified by similar reference numerals. The means for alternately supplying a batch of ice lumps and conveying medium into the main conduit 73 also, in this embodiment of the invention, comprises the control circuit 86 which switches on and off the motor 79 of the blower 78 as will be described below. The main valve 88 comprises three ports, namely, a pair of inlet ports 89 and 90 and an outlet port 91. The outlet port 91 is connected to the upstream end 76 of the main conduit 73. The inlet port 89 is connected through a connecting means in this case a connecting conduit 92 to the hopper outlet 80. The inlet port 90 of the main valve 88 is connected to the blower 78 by communicating means in this case a communicating conduit 93 extending from the air blower 78 to the inlet port 90.

The connecting conduit 92 extends downwardly from the hopper outlet 80 to the main valve 88 to facilitate delivery of batches of ice lumps from the hopper 2 into the main conduit 73 under gravity. A portion 94 of the main conduit 73 adjacent the upstream end 76 extends downwardly from the main valve 88 also for facilitating delivery of the batches of ice lumps under gravity into the main conduit 73. In this embodiment of the invention, the length of the connecting conduit 92 extending downwardly from the hopper outlet is approximately 0.03 meters and the length of the portion 94 of the main conduit 73 extending downwardly from the main valve 88 is approximately 0.70 meters.

In this embodiment of the invention, the main and secondary conduits 73 and 74 are of size and construction similar to the main conduits 5 of the apparatus 1. The connecting conduit 92 is also of similar size to the connecting conduit 25 of the conveying apparatus 1 of FIGS. 1 to 8. Air is delivered at a pressure in the range of 0.1 bar to 0.8 bar to the main conduit 73 from the blower 78.

Monitoring means for monitoring when a batch of ice lumps has been conveyed to a dispenser 72 comprises a pressure sensor 95 similar to the pressure sensor 37 of the apparatus 1 of FIGS. 1 to 8. The pressure sensor 95 is mounted on the communicating conduit 93 for monitoring back pressure in the communicating conduit 93. Level sensors 96 are provided in each dispenser 72 for determining the level of ice lumps in the respective dispensers 72.

Referring now to FIGS. 10 to 14, the diverter valves 75 will now be described. Each diverter valve 75 comprises a housing 98 comprising top and bottom walls 99 and 100, respectively, joined by side walls 101 and lateral end walls 102 which together define a hollow interior region 103. A valving member, namely, a valve plate 104 having a valve opening 105 is slidably mounted in the interior region 103. A solenoid 106 mounted by a bracket 107 to the housing 98 is connected to the valve plate 104 by a connecting rod 108 for sliding the valve plate 104 through the interior region 103 from a first position adjacent one lateral end wall 102 to a second position adjacent the other lateral end wall 102. The valve plate 104 is illustrated in the first position in FIG. 13 and in the second position in FIG. 14. A pair of outlet ports 109 and 110 extend from the bottom wall 100 and are respectively connected to the main conduit 73 to a portion of the main conduit 73 downstream of the diverter valve 75 and to a secondary conduit 74. An inlet port 111 extends from the valve plate 104 and communicates with the valve opening 105. The inlet port 111 is connected to the portion of the main conduit 73 on the upstream side of the diverter valve 75. A slot 112 in the top wall 99 accommodates the inlet port 111. Each diverter valve 75 communicates a portion of the main conduit 73 upstream of the diverter valve 75 with a portion of the main conduit 73 downstream of the diverter valve 75 when the diverter valve 75 is in the first position of FIG. 13. The upstream end of the main conduit 73 is communicated with the corresponding secondary conduit 74 when the diverter valve is in the second position of FIG. 14. When the valve plate 104 is in the first position, the inlet port 111 communicates with the outlet port 109 through the valve opening 105, see FIG. 13. When the valve plate 104 is in the second position, the inlet port 111 communicates with the outlet port 110 through the valve opening 105.

In this embodiment of the invention, the interior region 103 of the housing 98 is adapted to receive a flowable disinfectant material, namely, a disinfectant grease. The disinfectant grease is pressurized and prevents the ingress of contaminants into the outlet ports 109 and 110 and the inlet port 111. First and second sealing means comprising O-rings 114 and 115, respectively, co-operate with the valve plate 104 and the housing 98 to prevent the grease entering the outlet ports 109 and 110 and the inlet port 111. The O-ring seal 114 extends in a groove 116 around the slot 112, while two O-ring seals 115 extend in grooves 117 around the outlet ports 109 and 110. Secondary outlets 118 in the end walls 102 are connected through a connecting means, namely, a connecting tube 119 for accommodate the flow of grease between the ends of the interior region 103 as the valve plate 104 slides from one end wall 102 to the other end wall 102 of the housing 98.

Figure 15:
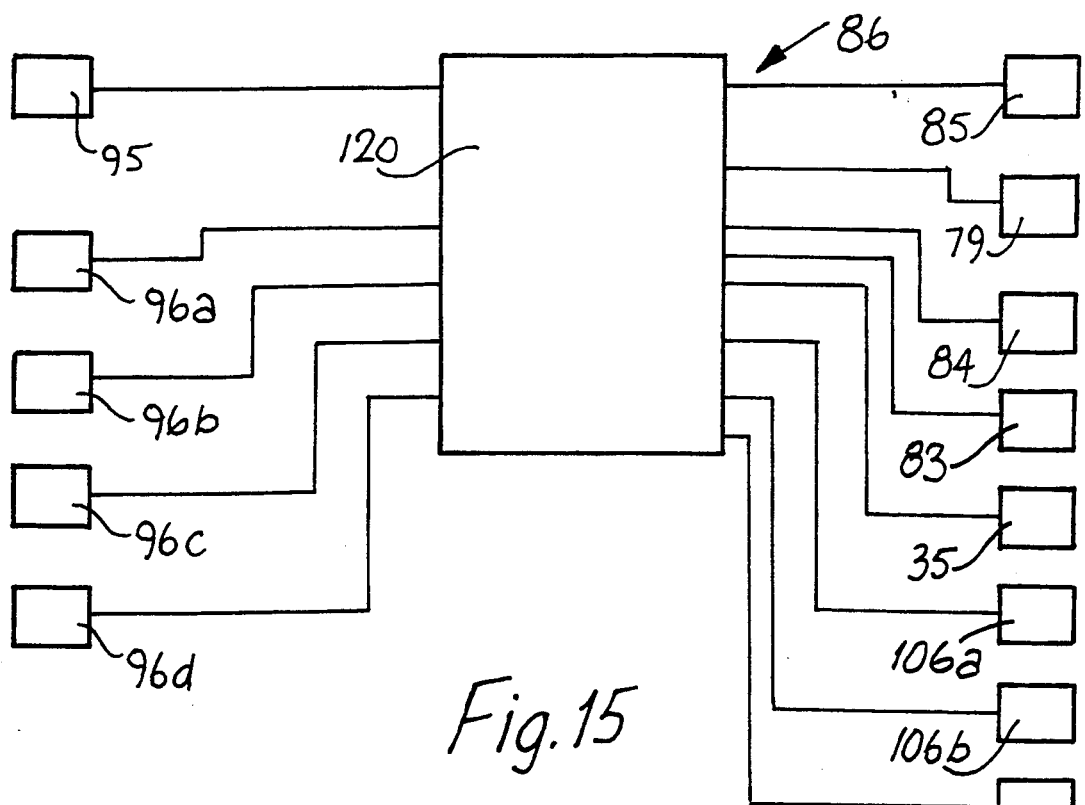
FIG. 15 is a block representation of a control circuit of the apparatus of FIG. 9.
Figure 21:
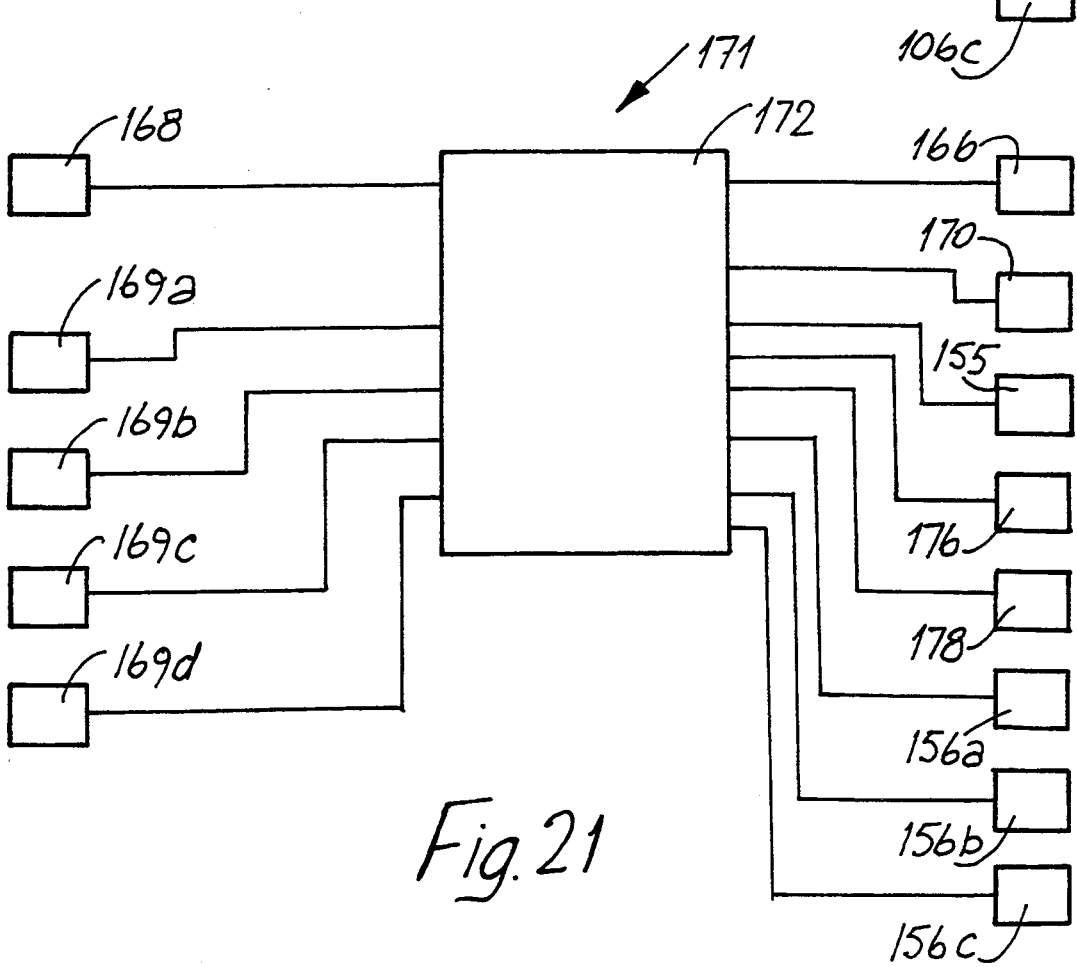
FIG. 21 is a block representation of a control circuit of the apparatus of FIG. 19.

Referring now to FIG. 15, the control circuit 86 for controlling the apparatus 70 is illustrated in block representation. The control circuit 86 comprises a central processing unit 120 which controls and reads the timer 85. The central processing unit also reads the pressure sensor 95 and the level sensors 96a to d of the dispensers 72a to d. The operation of the motor 84 for driving the discharge paddles (not shown) and the motor 79 for driving the blower 78 is also controlled by the central processing unit 120. The operation of the solenoid 83 of the metering valve 81 is controlled by the central processing unit 120 as is the electromagnet 35 of the main valve 88. The solenoids 106a to c of the diverter valves 75a to c are controlled by the central processing unit for communicating the upstream end 76 of the main conduit 73 with the dispenser 72 requiring ice lumps for conveying batches of ice lumps thereto. The central processing unit 120 operates under the control of software which comprises a main computer programme and a plurality of routines. One routine polls the level sensors 96a to d of the dispensers 72a to d to ascertain if a demand for ice lumps exists at any of the dispensers 72. This routine is substantially similar to the polling routine of FIG. 7 of the apparatus 1. A flow chart of a routine for conveying ice lumps from the main storage hopper 71 to a dispenser 72 is illustrated in FIG. 16.

Figure 16:
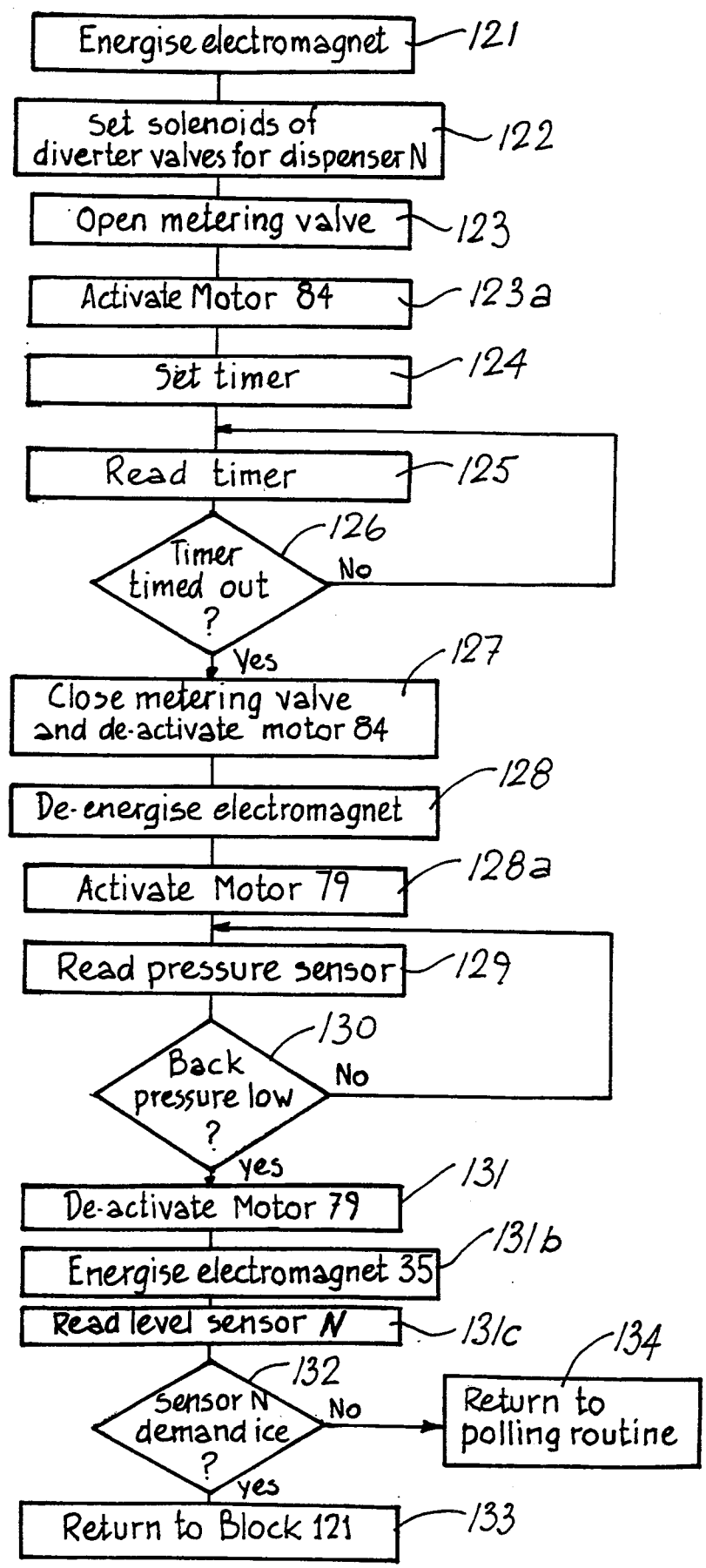
FIG. 16 is a flow chart of a routine of a computer programme for controlling the apparatus of FIG. 9.

Referring to FIG. 16, the flow chart of the ice lump conveying routine will now be described. On a dispenser 72 requiring ice, block 121 energises the electromagnet 35 of the main valve 88, thereby retaining the main valve 88 in the ice delivery position. Block 122 operates the solenoids 106 to set the diverter valves 75 so that only the dispenser 72 number N requiring ice is connected to the upstream end 76 of the main conduit 73. In this embodiment of the invention, the number N is an integer from 1 to 4 corresponding respectively with the dispensers 72a to 72d. This is similar to the value of N described with reference to the apparatus 1. Block 123 operates the solenoid 83 which opens the metering valve 81 for metering a batch of ice lumps through the hopper outlet 80. Block 123a activates the motor 84 for driving the discharge paddle for discharging ice lumps through the outlet 80 and the metering valve 81. Block 124 sets the timer 85 to commence timing a predetermined interval which determines the batch size of the ice lumps. The operations of blocks 123, 123a and 1224 are carried out simultaneously. Block 125 reads the timer and moves the routine on to block 126 which checks if the timer 85 has timed out. If the timer has not timed out, the subroutine returns to block 125. If the timer has timed out, the routine moves to block 127, which de-activates the motor 84 and operates the solenoid 83 which closes the metering valve 81, thereby preventing the delivery of further ice lumps through the metering valve 81. The routine then moves to block 128 which de-energises the electromagnet 35 of the main valve 88. The routine moves to block 128a which activates the motor 79 to drive the blower 78 for supplying conveying air to the main conduit 73. The action of the conveying air on the valving flap of the main valve 88 pivots the valving flap into the air supply position, and conveying air is delivered into the main conduit 73 for conveying the batch of ice lumps to the dispenser 72 number N. The routine then moves to block 129, which reads the pressure sensor 95, and moves to block 130. Block 130 checks if the pressure read from the pressure sensor 95 is low. If the pressure is not low, the routine is returned to block 129. If the pressure read from the pressure sensor 95 is low, indicating that the batch of ice lumps has been conveyed to the dispenser 72 number N, the routine moves on to block 131. Block 131 de-activates the motor 79 thereby terminating the supply of conveying air to the main conduit 73. This per, nits the valving member of the main valve 88 to return to the ice delivery position under the weight of the counter weight 34. Block 131b energises the electromagnet 35, thereby retaining the main valve 88 in the ice delivery position. Block 131c reads the level sensor 96 of the dispenser 72 number N and moves the routine on to block 132. Block 132 checks if the sensor 96 of the dispenser 72 number N is demanding more ice lumps. If ice lumps are demanded, the routine moves to block 133 which returns the routine to block 121 to convey another batch of ice lumps to the dispenser 72 number N. If no more ice lumps are demanded, the routine moves to block 134 which returns the control of the central processing unit 120 to the polling routine. In this case, control is returned to a block similar to the block 42 of the polling routine of FIG. 7.

In use, operation of this apparatus 70 is substantially similar to the operation of the apparatus 1. Initially at set up the dispensers 72 are filled with ice lumps sequentially from dispenser 72a to dispenser 72d. The ice lumps are conveyed in batches to each dispenser 72 until that dispenser 72 has been filled. The diverter valves 75 are then reset to communicate the next sequential dispenser 72 with the upstream end 76 of the main conduit 73. Batches of ice lumps are conveyed through the main conduit 73 and the secondary conduit 75 using the routine of FIG. 16. The polling routine (not shown) polls the level sensors 96 of the dispensers 72. On a dispenser 72 demanding ice, the ice conveying routine of FIG. 16 is called up and batches of ice lumps are conveyed to the dispenser 72 demanding ice until the demand for ice has been satisfied. The control of the central processing unit 120 is then returned to the polling routine (not shown), which polls the next sequential dispenser 72, and so on.

It will be appreciated that in this embodiment of the invention at any one time only one single batch of ice lumps is being conveyed through the main and secondary conduits 73 and 74. The next batch of ice lumps is not dispensed from the main hopper 2 until the previously dispensed batch of ice lumps has been conveyed to the dispenser 72.

It is envisaged that in certain cases, prior to the diverter valves 75 being set to connect a dispenser 72 with the upstream end 76 of the main conduit 73, conveying air may be delivered into the main conduit 73 for clearing the main and secondary conduits 73 and 74 of any residual matter prior to setting the diverter valves 75.

If desired, the software in the central processing unit 120 may comprise a routine for introducing a delay between each polling cycle of the dispensers 72. A typical delay may be 120 seconds.

In the event that a period of time of, for example, sixty minutes elapses since the conveying apparatus carried out a conveying cycle for conveying a batch of ice lumps to a dispenser 72, a drying cycle routine in the central processing unit 120 is called up to put the conveying apparatus 70 through a drying cycle. In a drying cycle, the motor 79 is activated to drive the blower 78 for delivering conveying air into the main conduit 73 for drying. The electromagnet 35 of the main valve 88 is de-energized, thereby permitting the supply of conveying air from the blower 78 into the main conduit 73. The diverter valves 75 are sequentially set after respective intervals of ten minutes for connecting the respective dispensers 72a to 72d to the upstream end 76 of the main conduit 73 so that air is blown through the main conduit 73 and each secondary conduit 74 for time periods each of ten minutes. As described with reference to the conveying apparatus of FIGS. 1 to 8, the time periods during which conveying air for drying is delivered into the main conduit 73 and each secondary conduit 74 may be longer or shorter than ten minutes as desired, and as required. Indeed, the time period may vary from secondary conduit 74 to secondary conduit 74, depending on the length and the configurations of the secondary conduits 74. During a drying cycle, the polling routine of the central processing routine continues to poll the dispensers 72 to ascertain if there is a demand for ice lumps. If such a demand exists, the drying cycle is terminated and the central processing unit under the control of the ice conveying routine delivers batches of ice lumps to the appropriate dispenser 72. On the drying cycle being completed, the conveying apparatus returns to normal mode and the polling routine of the central processing unit 120 continues to poll the dispensers 72a to 72d at appropriate intervals.

A routine for carrying out a cleaning cycle of the apparatus 70 is also provided in the central processing unit 120. A cleaning cycle is substantially similar to a conveying cycle with the exception that a dose of cleaning liquid, for example, a detergent, disinfectant or sanitising liquid is delivered into the main conduit 73 from the main storage hopper 71 through the hopper outlet 80 and the connecting conduit 92. The cleaning liquid is then blown through the main conduit 73 and secondary conduits 74 by conveying air from the blower 78 for cleaning and/or disinfecting the inner surfaces of the conduits 73 and 74 and the main valve 88 and the diverter valves 75. Throughout a cleaning cycle, as will be described below, the diverter valves 75 are sequentially re-arranged so that the main conduit 73 and all the secondary conduits 74 are subjected to the cleaning liquid, as well as the dispensers 72. Any suitable detergent, disinfectant or sanitising liquid may be used, or indeed a combination of two or three of such liquids may be used. In general, it is envisaged that a dose of cleaning liquid would comprise approximately 1 liter to 8 liters of the liquid. However, this will depend on the length of conduit to be cleaned, disinfected, sanitised or the like, and the strength of the liquid. It is preferable that the liquid used should be of the type which cleans, disinfects or sanitises as the case may be on contact with a surface.

To improve dispersion of the cleaning liquid over the inner surfaces of the conduits 73 and 74 and the valves 88 and 75, in other words, to improve wetting of these surfaces, one or more body members in this case spherical body members (not shown) of resilient material are introduced into the main storage hopper 71 with the cleaning liquid and are discharged through the hopper outlet 80 by the action of the discharge paddles (not shown), through the metering valve 81 and are delivered through the connecting conduit 92, the main valve 88 into the main conduit 73. The body members (not shown) and cleaning liquid are then blown through the main conduit 73 and the selected secondary conduit 74, thereby causing improved wetting of the inner surfaces of the conduits 73 and 74 and the valves 88 and 75. In this embodiment of the invention, each body member is of a resilient sponge material encapsulated in a net of plastics material. The diameter of the body member is approximately 10% less than the diameter of the inner cross section of the main and secondary conduits 73 and 74.

A cleaning cycle is as follows. The electromagnet 35 of the main valve 88 is energised, thereby retaining the main valve 88 in the ice delivery position. The diverter valves 75 are set to communicate one of the dispensers 72 with the main storage hopper 71. A dose of cleaning liquid and a number of body members, for example, from 1 to 10 are introduced into the main storage hopper 71. The motor 84 is activated to rotate the discharge paddles, and the metering valve 81 is opened, thereby permitting the cleaning liquid and the body men%bets to flow under gravity into the main conduit 73 through the connecting conduits 72 and the main valve 88. The electromagnet 35 of the main valve 88 is de-energised. The motor 79 is then activated for driving the blower 78 for supplying conveying air into the main conduit 73 through the main valve 88. The conveying air supplied by the blower 78 conveys the cleaning liquid and the resilient member or members (not shogun) through the main conduit 73 and the selected secondary conduit 74 to the corresponding dispenser 72. As the conveying air conveys the cleaning liquid and resilient body members, turbulence is generated between the cleaning liquid and the conveying air, thereby causing the cleaning liquid to splash and wet the inner surface of the conduits 73 and 74 and the valves 75 and 88. The wetting action is further enhanced by the action of the resilient body members moving through the conduits 73 and 74. On the cleaning liquid and resilient body member having been conveyed to the dispenser 72, the motor 79 is de-activated, thereby terminating the supply of conveying air to the main conduit 73. The resilient body members are then removed from the dispenser 72 at the remote location and returned to the main storage hopper 71 for use with the next dose of cleaning liquid in the next cleaning cycle.

For each setting of the diverter valves 75, the conveying apparatus 70 may be subjected to one or more cleaning cycles. It is envisaged that from one to five cleaning cycles may be provided for each setting of the diverter valve 75. A separate dose of cleaning liquid together with the resilient body members is provided for each cleaning cycle. On the desired number of cleaning cycles having been completed, the setting of the diverter valves 75 is re-arranged for communicating the next sequential dispenser 72 with the main storage hopper 71. The cleaning cycle or cycles are then repeated and subsequently the diverter valves 75 are reset to communicate the next sequential dispenser 72 with the main storage hopper 71 and so on.

It will be appreciated that a routine for carrying out a cleaning cycle substantially similar to the cleaning cycle just described may be provided in the central processing unit 40 of the conveying apparatus 1 of FIGS. 1 to 8. The cleaning routine in the case of the conveying apparatus 1 would sequentially operate the main valves 20 of the conveying apparatus 1 for sequentially cleaning, disinfecting, sanitising or the like the main conduits 5.

It will of course be appreciated that the conveying air delivered by the air blower in the conveying apparatus of FIGS. 1 to 8 and the conveying apparatus of FIGS. 9 to 16 may be treated prior to being delivered into the main conduit. In fact, it is envisaged that the air may be treated adjacent the air blower, or indeed, upstream of the air blower. Needless to say, where other conveying medium sources are provided, the conveying medium may also be treated. Such treatment may comprise passing the air through filters, scrubbers and the like to remove contaminants, bacteria and the like from the conveying air or conveying medium. Additionally, the treatment may comprise regulating the humidity of the air, for example, drying the air or the like. Such treatment of the conveying air or conveying medium can be carried out irrespective of whether the conveying air or conveying medium is used to convey ice lumps, carry out a drying cycle or carry out a cleaning cycle.

Figure 17:
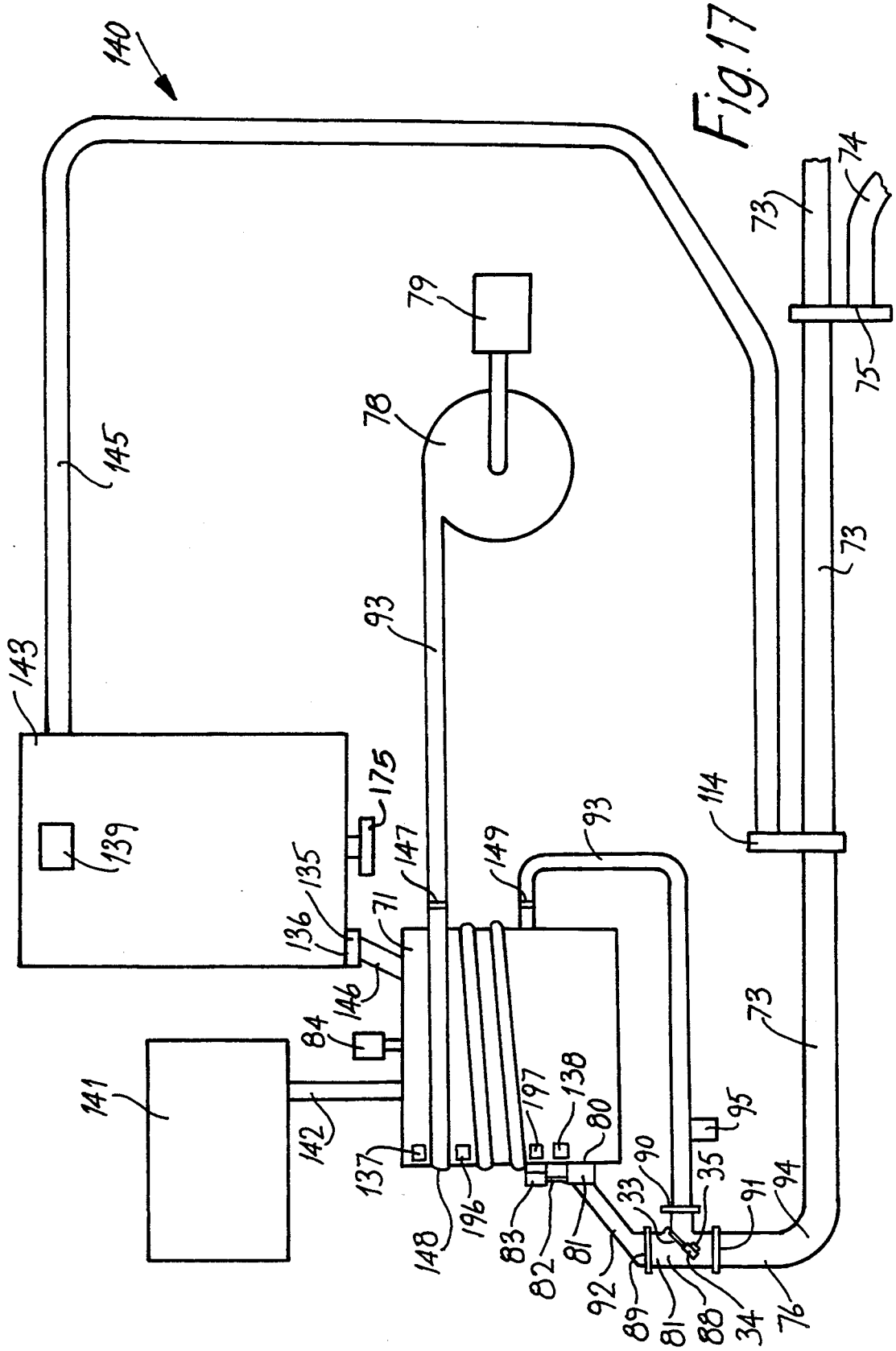
FIG. 17 is a block representation of conveying apparatus according to another embodiment of the invention for conveying ice lumps from an ice lump source to a plurality of remote locations.
Figure 18:
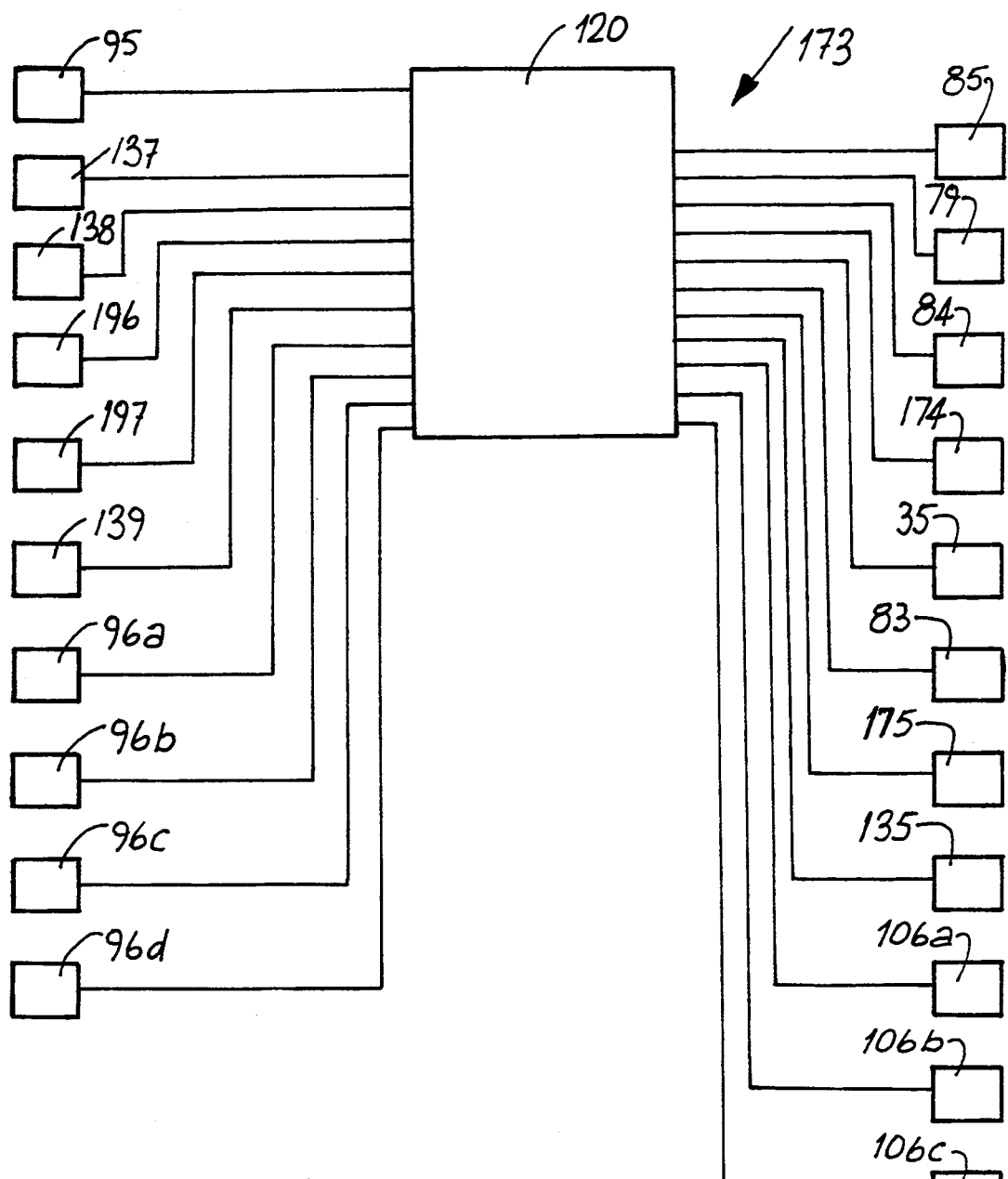
FIG. 18 is a block representation of a control circuit of the apparatus of FIG. 17.
Figure 20:
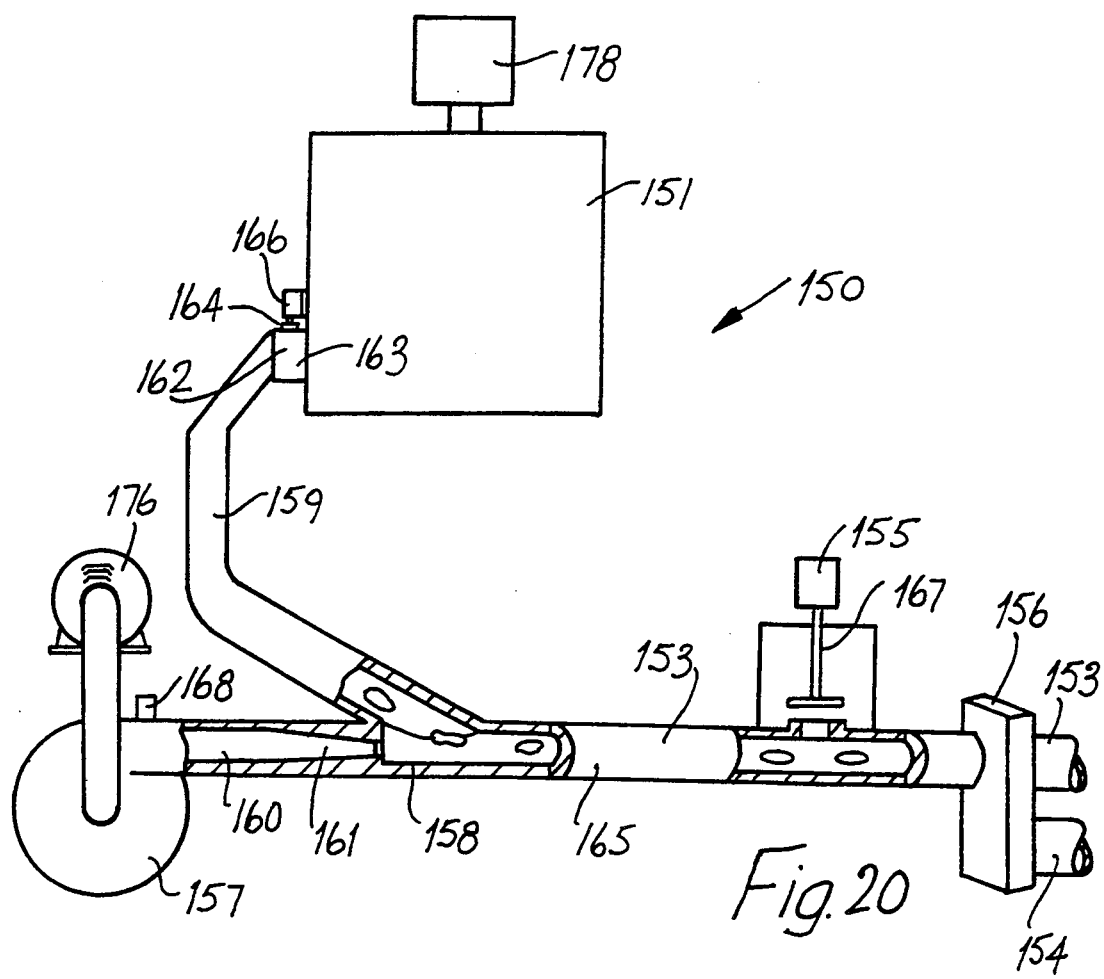
FIG. 20 is a cut-away elevational view of portion of the apparatus of FIG. 19.
Figure 19:
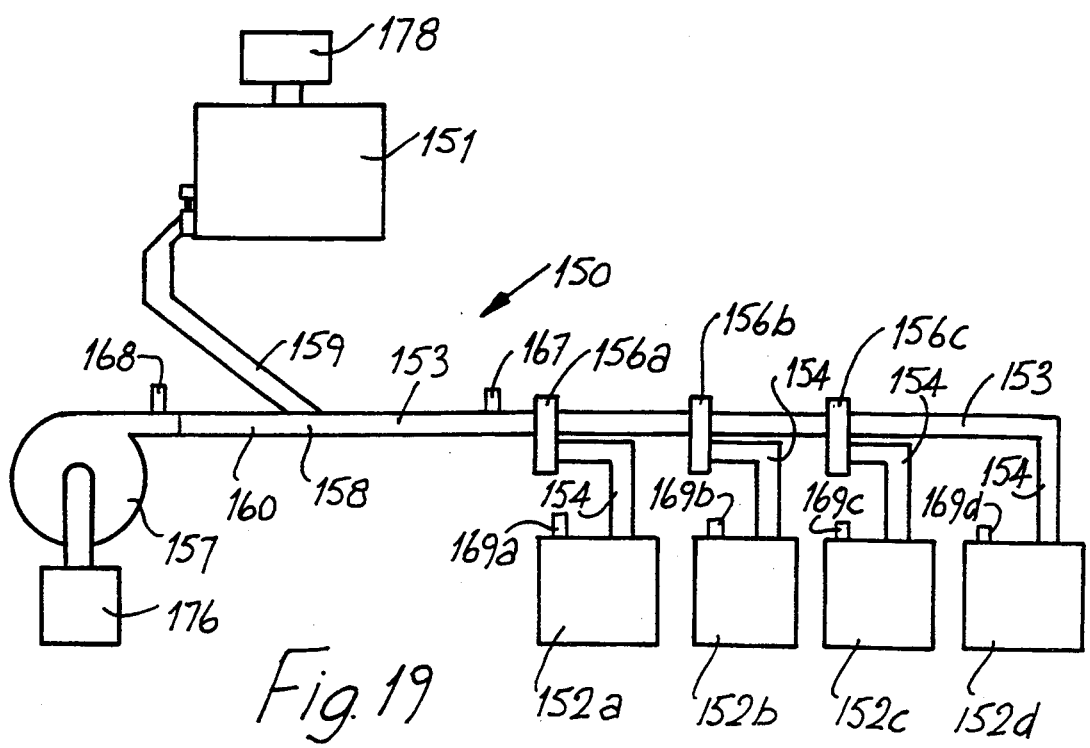
FIG. 19 is a block representation of conveying apparatus according to a further embodiment of the invention for conveying ice lumps from an ice lump source to a plurality of remote locations.

Referring now to FIGS. 17 and 18, there is illustrated portion of conveying apparatus 140 for conveying batches of ice lumps from an ice lump source to a plurality of, namely, four dispensers at remote locations. The apparatus 140 is substantially similar to the apparatus 70 and similar components are identified by the same reference numeral.

The main difference between this apparatus 140 and the apparatus 70 is that a buffer storage means comprising a buffer storage bin 143 is provided for storing ice lumps produced during off peak periods when demand for ice by the dispensers (not shown) at the remote locations is relatively low, for subsequent use at peak demand periods when the demand for ice lumps from the dispensers is relatively high. An ice maker 141 for making ice lumps is illustrated in block representation. Operation of the ice maker 141 is under the control of the central processing unit 120 of a control circuit 173 for controlling the apparatus 140. The control circuit 173 is substantially similar to the control circuit 86 of the apparatus 70 and similar components are identified by the same reference numeral.

The apparatus 140 comprises a main storage hopper 71 which delivers batches of ice lumps through a metering valve 81 into the main conduit 73 through a main valve 88. Conveying air is delivered into the main conduit 73 through the main valve 88 from a blower 78 driven by a motor 79. A plurality of diverter valves 75, only one of which is illustrated, communicates the main conduit 73 through secondary conduits 74 with a plurality of dispensers (not shown) similar to the dispensers 72. The ice maker 141 makes the ice lumps and delivers the ice lumps into the main storage hopper 71 through a delivery chute 142.

A secondary diverter valve 144 in the main conduit 73 communicates a delivery conduit 145 with the main conduit 73 for delivering ice lumps in batches into the buffer storage bin 143. The secondary diverter valve is controlled by the central processing unit of the control circuit 173. Delivery means comprising a gate valve 135 in an outlet 136 delivers ice lumps to the main storage hopper 71 from the buffer storage bin 143 down a chute 146 which communicates the buffer storage bin 143 with the main storage hopper 71. The gate valve 135 is solenoid operated and controlled by the central processing unit 120 of the control circuit 173. Discharge paddles (not shown) similar to the discharge paddles 4 of the main storage hopper 2 of the apparatus 1 of FIGS. 1 to 7 is provided in the buffer storage bin 143 for discharging ice lumps through the outlet 136. An electrically powered motor 175 under the control of the central processing unit rotates the discharge paddles (not shown). In this embodiment of the invention, the ice maker 141 and the buffer storage bin 143 are mounted above the main storage hopper 71, so that ice lumps may be delivered from the ice maker 141 and the buffer storage bin 143 under gravity into the hopper 71.

Sensing means comprising level sensors 137, 138, 196 and 197 are mounted in the main storage hopper 71 for monitoring the level of ice lumps in the main storage hopper 71 for controlling the conveying of batches of ice lumps from the main hopper 71 to the buffer storage bin 143, and also for controlling the delivery of ice lumps from the buffer storage bin 143 to the main storage hopper 71. This is described in detail below. The level sensors 137, 138, 196 and 197 are read by the central processing unit 120. The level sensor 137 is a maximum level sensor, and on the level of ice lumps in the main storage hopper 71 reaching the level of the maximum level sensor 137, the ice maker 141 is deactivated by the central processing unit 120 of the control circuit 173. The level sensor 138 is a minimum level sensor, and on the level of ice lumps in the main storage hopper 71 dropping to the level of the minimum level sensor 138, an ice lump delivery routine, described below, is activated in the central processing unit 120 for delivering ice lumps from the buffer storage bin 143 into the main hopper 71. The level sensor 196 is an intermediate maximum level sensor, and on the level of ice lumps in the main storage hopper 71 reaching the level of the intermediate maximum sensor 196, the central processing unit under the control of an ice lump conveying routine delivers batches of ice lumps from the main storage hopper 71 to the buffer storage bin 143. The level sensor 197 is an intermediate minimum level sensor, and on the level of ice lumps in the main storage hopper 71 dropping to the level of the intermediate minimum level sensor 197, the ice lump conveying routine is terminated and no further batches of ice lumps are delivered to the buffer storage bin 143 until the level of ice lumps in the main storage hopper 71 again reaches the level of the intermediate maximum level sensor 196.

A maximum level sensor 139 is mounted on the buffer storage bin 143 for controlling the maximum level of ice lumps in the buffer storage bin 143 to avoid overfilling of the buffer storage bin 143. The level sensor 139 is read by the central processing unit 120.

A suitable software routine is provided in the central processing unit 120 for operating the conveying apparatus 140 for conveying batches of ice lumps into the buffer storage bin 143 and also for delivering the ice lumps from the buffer storage bin 143 into the main storage hopper 71. The operation of the routine for conveying batches of ice lumps from the hopper 71 into the buffer storage bin 143 is substantially similar to the routine for conveying batches of ice lumps from the main storage hopper 71 to a dispenser 72 already described with reference to FIG. 16 of the apparatus 70. The polling routine polls the level sensors 137, 138, 196 and 197 in the main storage hopper 71 and on the level of ice lumps in the main storage hopper 71 exceeding the intermediate maximum level sensor 196, the ice lump conveying routine sets the diverter valve 144 to communicate the main conduit 73 with the buffer storage bin 143 and batches of ice lumps are conveyed through the main conduit 73 and the delivery conduit 145 until the level of ice lumps in the main storage hopper 71 drops to the level of the intermediate minimum level sensor 197, or until the polling routine determines that a demand for ice lumps exists at a dispenser (not shown), or until the level of ice lumps in the buffer storage bin 143 reaches the level of the level sensor 139. On the level of ice lumps in the main storage hopper 71 dropping to the level of the intermediate minimum level sensor 197, the conveying routine conveying ice lumps from the main storage hopper 71 to the buffer storage hopper 143 is terminated, and control of the central processing unit 120 is returned to the polling routine. On the other hand, should the polling routine determine that a demand for ice lumps exists while the central processing unit 120 is under the control of the ice lump conveying routine conveying ice lumps from the main storage hopper 71 to the buffer storage bin 143, that ice lump conveying routine is terminated and the central processing unit 120 under the control of an ice lump conveying routine commences to deliver batches of ice lumps to the dispenser demanding ice lumps.

On the polling routine determining that the level of ice lumps in the main storage hopper 71 has dropped to the level of the minimum level sensor 138, the ice lump delivery routine in the central processing unit 120 is called up. The ice lump delivery routine controls the central processing unit 120 to open the gate valve 135 and to activate the motor 175 for delivering ice lumps from the buffer storage hopper 143 into the main storage hopper 71. On the level of ice lumps in the main storage hopper 71 reaching the level of the intermediate maximum level sensor 196, the ice lump delivery routine closes the gate valve 135 and de-activates the motor 175. The ice lump delivery routine is terminated, and control of the central processing unit 120 reverts to the polling routine.

While the central processing unit 120 is under the control of the ice lump conveying routine conveying ice lumps into the buffer storage bin 143, should the level of ice lumps in the buffer storage bin 143 reach the maximum predetermined level determined by the sensor 139, the ice lump conveying routine is terminated.

At any stage, should the polling routine determine that the level of ice lumps in the main storage bin 71 has reached the maximum level sensor 137, the central processing unit 120 under the control of a suitable routine de-activates the ice maker 141, such routines will be well known to those skilled in the art. Alternatively, the maximum level sensor 137 may be read directly by the ice maker 141 without any connections to the central processing unit 120.

Additionally, in this embodiment of the invention, heat exchange means is provided for cooling the conveying air prior to the conveying air being supplied into the main conduit 73. The heat exchange means comprises a heat exchanger comprising a heat exchange coil 148 of conduit wrapped around the outer surface of the main storage hopper 71. The heat exchange coil 148 comprises an inlet 147 and an outlet 149 which are connected to the communicating conduit 93 so that conveying air from the blower motor 78 is passed through the heat exchange coil 148 prior to being delivered into the main valve 88.

Operation of the apparatus 140 is substantially similar to the operation of the apparatus 70 with the exception that during off peak periods when there is a low demand for ice lumps from the dispensers 72, batches of ice lumps are delivered into the buffer storage bin 143. Furthermore, when there is high demand for ice lumps, ice lumps are delivered from the buffer storage bin 143 into the main storage hopper 71 as already described.

While a particular type of diverter valve and secondary diverter valve has been described for use in the apparatus of FIGS. 9 to 16 and FIGS. 17 and 18, any other suitable type of diverter valves may be used.

Referring to FIGS. 19 to 22, there is illustrated conveying apparatus according to another embodiment of the invention indicated generally by the reference numeral 150 for conveying ice lumps from an ice source, namely, a main storage hopper 151 to a plurality of in this case four secondary storage means, namely, dispensers 152a, 152b, 152c and 152d located at remote locations. The ice lumps are conveyed in batches through conveying conduit means, namely, a main conduit 153 and secondary conduits 154a to c. The main and secondary conduits 153 and 154 are substantially similar to the main and secondary conduits 73 and 74 of the apparatus 70. Furthermore, the size of the conduits 153 and 154 are similar in size to the main and secondary conduit 73 and 74. Each secondary conduit 154 is connected to the main conduit 153 by a respective diverter valve 156 similar to the diverter valves 75. A conveying medium source, namely, an air blower 157 supplies conveying medium, namely, conveying air into the main conduit 153 at an upstream end 158 thereof. The blower 157 is driven by an electrically powered motor 176 under the control of the control circuit 171 described with reference to FIG. 21 below. The main difference between the apparatus 150 and the apparatus 70 is that the main valve 88 of the apparatus 70 has been dispensed with in the apparatus 150, and conveying air is delivered continuously into the main conduit 153.

The main storage hopper 151 is similar to the main storage hopper 2 of the conveying apparatus 1 of FIGS. 1 to 8 with the exception that only a single outlet 177 is provided through which ice lumps are discharged from the hopper 151. Discharge paddles (not shown) rotatably mounted in the main storage hopper 151 are driven by an electrically powered motor 178 for discharging ice lumps through the outlet 177. The motor 178 is controlled by the control circuit 171.

In this embodiment of the invention, the upstream end 158 of the main conduit 153 is connected to the outlet 177 of the main storage hopper 151 by a connecting means, namely, a connecting conduit 159 which is substantially similar to the main conduit 153 and of similar cross section. A communicating means, namely, a communicating conduit 160 connects the upstream end 158 of the main conduit 153 with the blower 157. The communicating conduit 160 terminates in a nozzle 161 adjacent the upstream end 158 of the main conduit 153 for creating a venturi effect adjacent the junction of the connecting conduit 159 and the main conduit 153 for drawing ice lumps from the connecting conduit 159 into the main conduit 153 with a venturi action.

Metering means for metering batches of ice lumps through the connecting conduit 159 into the main conduit 153 comprises a metering valve 162 which is provided by a gate valve similar to the metering valves 14 of the conveying apparatus 1 of FIGS. 1 to 8. The metering valve 162 comprises a housing 163 and a closure plate 164 slidable in the housing 163 for opening and closing the valve 162. A solenoid 166 mounted on the housing 163 operates the closure plate 164 from an open to a closed position and vice versa. The solenoid 166 is controlled by the control circuit 171. A timer 170 in the control circuit 171 times the time period for which the solenoid 166 retains the metering valve 162 open and the motor 178 drives the discharge paddles (not shown) for determining the size of a batch of ice lumps.

A pressure release means, namely, a pressure release valve 167 is provided downstream in the main conduit 153 for exhausting conveying air from the main conduit 153 to further relieve pressure at the junction of the connecting conduit 159 and the main conduit 153 to facilitate delivery of ice lumps into the main conduit 153. The pressure release valve 167 by reducing pressure at the junction of the connecting conduit 159 and the main conduit 153 also prevents back flow of conveying air through the connecting conduit 159 into the main storage hopper 151 when the metering valve 162 is open. A solenoid 155 operates the pressure release valve 167 under the control of the control circuit 171. In certain cases, it is envisaged that the pressure release means of this embodiment of the invention may be dispensed with altogether, or where a pressure release means is provided, other suitable pressure release means may be used.

In this embodiment of the invention, the connecting conduit 159 extends downwardly from the main storage hopper 151 to facilitate delivery of ice lumps under gravity to the main conduit 153. Although not illustrated, if desired, an upstream portion 165 of the main conduit 153 may also extend downwardly from the connecting conduit 159 to further facilitate delivery of the ice lumps into the main conduit 153 under gravity.

Monitoring means for determining when a batch of ice lumps has been delivered to a dispenser comprises a pressure sensor 168 similar to the pressure sensor 95 of the conveying apparatus 70. The pressure sensor 168 is mounted on the communicating conduit 160 for monitoring the back pressure of conveying air in the communicating conduit 160. Level sensors 169 similar to the level sensors 96 of the conveying apparatus 70 monitor the level of ice lumps in the dispensers 152.

It is envisaged that in certain cases the pressure sensor 168 may be dispensed with. In such cases, suitable sensors may be provided in the dispensers for determining when a batch of ice lumps has been conveyed to a dispenser. Alternatively, a timer may be provided which would determine the length of time between batches being conveyed, and the time would be set sufficiently long to allow time for each batch to be conveyed to a dispenser before the next batch was delivered into the main conduit.

The control circuit 171 comprises a central processing unit 172 which reads the pressure sensor 168 and the level sensors 169. The central processing unit 172 controls the solenoid 166 of the metering valve 162 and the solenoid 155 and the pressure release valve 167. The central processing unit 172 also sets and reads the timer 170, and further, controls the diverter valves 156a, b and c. The central processing unit also controls the operation of the motors 176 and 178. The central processing unit 172 operates under the control of software which includes routines similar to those already described. A polling routine similar to the polling routine of the conveying apparatus 1 is provided for polling the dispensers 152a to 152d to determine if a demand for ice exists. A flow chart of an ice conveying routine for conveying batches of ice lumps to the dispensers 152 is illustrated in FIG. 22.

Figure 22:
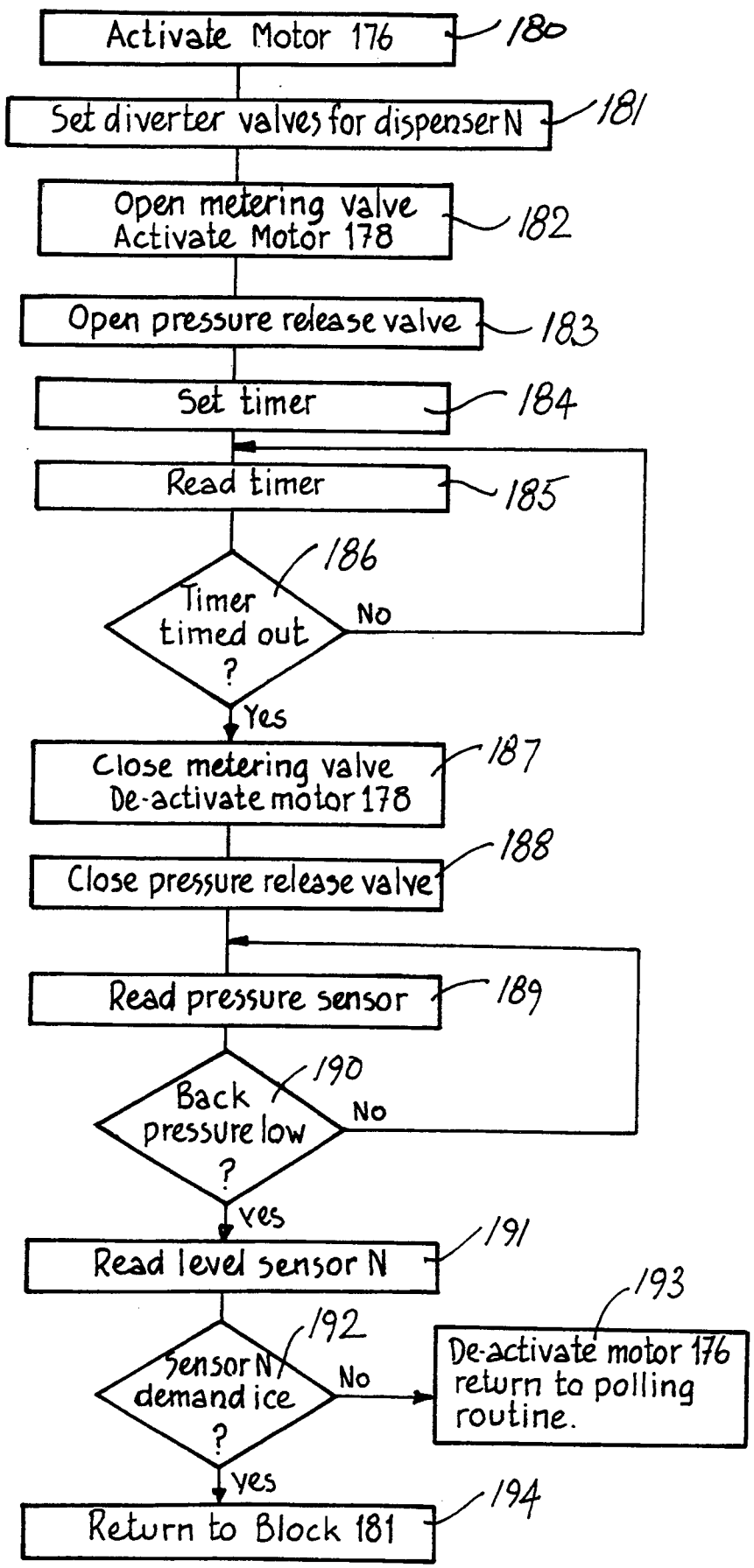
FIG. 22 is a flow chart of a routine of a computer programme for controlling the apparatus of FIG. 19.

Referring to FIG. 22, block 180 of the flow chart activates the motor 176 to drive the blower 157 for delivering conveying medium through the nozzle 161 into the main conduit 153. Block 181 operates the solenoids 106 and sets the diverter valves 156 to communicate the dispenser 152 number N demanding ice lumps with the upstream end 158 of the main conduit 153. Block 182 operates the solenoid 166, which opens the metering valve 162 and activates the motor 178 for delivering a batch of ice lumps into the main conduit 153. Block 183 operates the solenoid 155, which opens the pressure release valve 167 for relieving pressure at the junction of the connecting conduit 159 and the main conduit 153. Block 184 sets the timer 170 to commence timing the time period for which the motor 178 is to drive the discharge paddles (not shown) and the metering valve 162 is to remain open for delivering the batch of ice lumps. The operations of blocks 182, 183 and 184 are carried out simultaneously. The routine then moves to block 185 which reads the timer and block 186 checks if the timer has timed out. If the timer has not timed out, the routine returns to block 185. If the timer 170 has timed out, the routine moves on to block 187, which closes the metering valve 162 and de-activates the motor 178. The routine then moves to block 188 which closes the pressure release valve 167 after a further short time delay. The routine moves on to block 189, which reads the pressure sensor 168 and moves on to block 190, which checks if the back pressure read from the pressure sensor 168 is low. If the back pressure is not low, the routine returns to block 189. If the back pressure read from the pressure sensor 168 is low, the routine move on to block 191 which reads the level sensor in the dispenser 152 number N and moves the routine on to block 192. Block 192 checks if the level sensor 169 of the dispenser 152 number N is demanding ice. If no more ice is being demanded, the routine moves to block 193 which de-activates the motor 176, thereby terminating the supply of conveying air to the main conduit 153, and returns the control of the central processing unit to the polling routine. The control would be returned to a block similar to block 42 of the routine of FIG. 7. Should the level sensor 169 of the dispenser 152 be demanding more ice lumps, the routine moves to block 194, which returns the routine to block 181 to con, hence another ice lump conveying cycle. If desired, the motor 176 may run continuously to continuously supply conveying air into the main conduit 153, even when there is no demand for ice lumps. In which case, block 193 would not de-activate the motor 176.

The routine of FIG. 22 is so arranged that at any one time only one batch of ice lumps will be conveyed through the main conduit 153 and a secondary conduit 154.

In use, the polling routine polls the dispensers 152 to determine if a dispenser is demanding ice. On a demand for ice being made by a dispenser 152, the central processing unit 172 calls up the ice lump conveying routine, which operates as just described with reference to the flow chart of FIG. 20 delivering batches of ice lumps to the dispenser 152 demanding ice.

During periods where batches of ice lumps are not being demanded, the motor 176 driving the blower 157 may be de-activated. Indeed it is envisaged that the motor 176 may be normally de-activated and would only be activated on by the ice lump conveying routine after the diverting valves had been set to communicate the particular dispenser demanding ice with the upstream end 158 of the main conduit 153. Furthermore, it is envisaged in certain cases that the motor 176 driving the blower 157 may be de-activated each time a batch of ice lumps has been conveyed to a dispenser, and would only be activated again after a batch of ice lumps had been delivered into the main conduit 153. Alternatively, the motor 176 may be activated simultaneously each time a batch of ice lumps is being delivered into the main conduit 153. Where the motor 176 driving the blower 157 is de-activated each time a batch of ice lumps has been conveyed to a dispenser, and is only activated after a batch of ice lumps has been delivered into the main conduit 153, it will be appreciated that the batches of ice lumps and conveying air will be alternately delivered into the main conduit. Where the conveying air is continuously delivered into the conduit, the batches of ice lumps will be intermittently delivered during delivery of the conveying air.

It will be appreciated that in certain cases the nozzle 161 may be dispensed with and air from the communicating conduit 160 would be delivered directly into the main conduit 153.

The pressure release valves 167, if desired, may be dispensed with, or where a pressure release valve is used, other suitable pressure release valves may be provided. It is also envisaged that pressure release means may be provided downstream in the main conduit adjacent one of the dispensers, or downstream in the secondary conduits adjacent a dispenser for slowing down batches of ice lumps in the conduit.

Referring now to FIGS. 23 and 24 a secondary storage means, namely, a dispenser also according to the invention indicated generally by the reference numeral 200 is illustrated. The dispenser 200 may be provided in place in any or all of the dispensers 7 of the conveying apparatus 1, the dispensers 72 of the conveying apparatus 70 and the dispenser 152 of the conveying apparatus 150. The dispenser 200 comprises a housing 201 which forms a cylindrically shaped dispensing hopper 202 which holds ice lumps and from which ice lumps are dispensed in relatively small metered quantities as will be described below. The dispensing hopper 202 is formed by a base 205, a circular side wall 206 extending upwardly from the base 205 to a top wall 207. The ice lumps are dispensed through any one of a plurality of outlets 203 in the side wall 206. In this embodiment of the invention, only three outlets 2203 from the dispensing hopper 202 are illustrated, however, in general, many more than three outlets 203 will be provided. In practice, it is envisaged that the dispenser 200 will be mounted overhead and dispensing tubes 204 will extend downwardly from the dispensing outlets 203 for dispensing the small metered quantities of ice lumps, which may, for example, be dispensed directly into a glass or the like. This aspect of the invention will be described in more detail below.

The housing 201 also forms a holding device 208 also according to the invention for holding ice lumps until a full batch of ice lumps has been delivered to the dispenser 200. The holding device 208 comprises a holding container 211 having a circular side wall 209 extending upwardly from the top wall 207 of the dispensing hopper 202 to a top wall 210. An inlet port 212 in the top wall 210 for connecting to a main conduit or a secondary conduit of the conveying apparatus 1, 70, 140 and 150 accommodates ice lumps into the holding device 208. A circular opening in the top wall 201 forms an outlet 213 from the holding container 211 which communicates the holding device 208 with the dispensing hopper 202 for delivery of a batch of ice lumps into the dispensing hopper 202. Valve means comprising a flap valve formed by a closure plate 215 selectively closes the outlet 213. The closure plate 215 is pivotally connected at 216 to the top wall. A spring (not shown) biases the closure plate 215 into the closed position closing the outlet 213. A retaining means for retaining the closure plate 215 in the closed position comprises a latch 218 operated by a solenoid 219 which retains the closure plate 215 closing the outlet 213. The closing force of the spring (not shown) acting on the closure plate 215 is sufficiently low that the weight of a batch of ice lumps on the closure flap 215 is sufficient to overcome the closing force and thereby open the closure plate 215 for delivery of a batch of ice lumps into the dispensing hopper 202. However, the spring force is sufficiently great that once the batch of ice lumps has been delivered into the dispensing hopper 202, the spring closes the closure plate 215 to close the outlet 213.

A drain means comprising a drain tube 220 from the side wall 209 of the holding device 208 adjacent the top wall 207 drains residual water from the holding device to prevent the water being delivered into the dispensing hopper 202. Suitable seals (not shown) are provided around the closure plate 215 to prevent the ingress of water into the dispensing hopper 202 when the closure plate 215 is closed. The orientation of the closure plate 215 and the arrangement of the seals is such as to direct water to the drain outlet 220.

Exhaust means for exhausting conveying air delivered with a batch of ice lumps from the holding device 208 comprises an exhaust vent 221 which extends around the side wall 209. The provision of the exhaust vent 221 avoids the conveying air being blown into the dispensing hopper 202. The closure plate 215 is retained closed until the conveying air has been exhausted through the exhaust vent 221.

The circular side wall 209 diverges outwardly downwardly towards the outlet 213. This it has been found avoids bridging of ice lumps of a batch of ice lumps in the holding device 208. While the holding device 208 has been described for holding a single batch of ice lumps, it will be appreciated that if desired the holding device 208 may hold more than a single batch of ice lumps.

Returning to the dispensing hopper 202, agitating means for agitating ice lumps in the dispensing hopper 202 comprises an agitator 224 for preventing bridging and fusing of ice lumps in the dispensing hopper 202. The agitator 224 also acts to urge ice lumps from the dispensing hopper 202 through the dispensing outlets 203. The agitator 224 comprises a plurality of paddles 225 extending radially from a drive shaft 226. The drive shaft 226 is rotatably mounted in bearings 227 centrally in the base 205 of the dispensing hopper 202. An electrically powered drive motor 228 drives the shaft 226 for rotating the paddles. It has been found that if the agitator 224 is only activated when ice lumps are to be dispensed through a dispensing outlet or outlets 203 from the dispensing hopper 202, the quantity of ice lumps dispensed is proportional to the number of rotations of the shaft 226. Accordingly, by counting the number of rotations of the shaft 226, the quantity of ice lumps dispensed from the dispensing hopper 202 can be determined. Furthermore, by monitoring the quantity of ice lumps delivered in batches into the dispensing hopper 202, as well as the rate of dispensing of ice lumps from the dispensing hopper 202, the level of ice lumps in the dispensing hopper 202 can be determined. This, in certain cases, is used as a means for determining the level of ice lumps in the hopper 202. However, if desired a level sensor which may be a mechanical, infra red, ultrasonic or thermostatic sensor, or the like may be provided in the dispensing hopper 202 for determining the level of ice lumps in the dispensing hopper 202.

It is envisaged that the closure plate 215 may be used for determining when the dispensing hopper 202 is full. When the dispensing hopper 202 is virtually full of ice lumps, a batch of ice lumps being delivered from the holding device 208 into the dispensing hopper 202 will not discharge fully from the closure plate 215, and the weight of the ice lumps on the closure plate 215 will retain the closure plate 215 open or partly open. The pressure sensor in the communicating conduit of any of the conveying apparatus already described may be used to determine the position of the closure plate or in certain cases an optical sensor, microswitch or the like may be used. While the closure plate is open, the pressure sensor will read a low back pressure. Accordingly, by supplying conveying air into the main conduit of the conveying apparatus for a short period of time after the ice lumps should have been delivered into the dispensing hopper 202, the position of the closure plate can be monitored by the pressure sensor. Once the closure plate 215 closes, the pressure sensor will detect a high back pressure.

Returning now to the dispensing tubes 204, each dispensing tube 204 at its upstream end 229 adjacent the dispensing outlet 203 comprises a metering apparatus which comprises a metering chamber 230 for collecting a metered quantity of ice lumps, in this case, typically ten ice lumps. The dispensing chamber 230 is formed in the dispensing tube 204 and comprises an inlet 231 and an outlet 232. A first valve means comprising a first solenoid operated gate valve 233 closes the inlet 231 and a second valve means, namely, a second solenoid operated gate valve 234 closes the outlet 232 from the metering chamber 230. Accordingly, to collect a metered quantity of ice lumps in the metering chamber 230, the second valve 234 is closed and the first valve 233 is opened, thereby allowing ice lumps into the metering chamber 230 until the metering chamber 230 is full, at which stage the first gate valve 233 is closed. When a metered quantity of ice lumps is required, the second valve 234 is opened, thereby dispensing the metered quantity of ice lumps into the dispensing tube 204. The second valve 234 is then closed, and the first valve 233 is again opened to collect the next metered quantity of ice lumps. A third valve means, namely, a third solenoid operated gate valve 235 is provided in each dispensing tube 204 adjacent a dispensing outlet, namely, a dispensing nozzle 236 for holding a metered quantity of ice lumps adjacent the nozzle 236 ready for dispensing through the nozzle 236. As well as acting to retain a metered quantity of ice lumps in the dispensing tube 204 adjacent the dispensing nozzle 236, the third solenoid operated gate valve 235 also acts to prevent ice lumps being discharged through the nozzle 236 directly from the metering chamber 230 with a high velocity which would cause splashing or the like if the ice lumps were discharged into a glass containing a beverage. A button operated switch 237 is provided on the nozzle 236 of each dispensing tube 204 for activating the third solenoid operated gate valve 235. The first, second and third valves 233, 234 and 235 are interlinked so that on a metered quantity of ice being dispensed through the nozzle 236, the third valve 235 closes and the second valve 234 opens to deliver another metered quantity of ice lumps to be retained in the dispensing tube 204 by the third valve 235. The first and second valves 233 and 234 of the metering chamber again operate as already described to collect the next metered quantity of ice.

When the dispenser 200 is used in connection with any of the conveying apparatus according to the invention already described, the dispenser 200 operates under the control of the central processing unit of the conveying apparatus. The first, second and third valves 233, 234 and 235 are monitored by the central processing unit and the operation of the motor 228 is controlled and monitored by the central processing unit, as is the solenoid operated latch 218. Alternatively, the monitoring and control of the valves and motor of the dispenser 200 may be carried out by a microprocessor specifically provided for the dispenser 200 or a group of dispensers 200. Such microprocessor may or may not be interlinked with a central processing unit of a conveying apparatus.

In use, with the solenoid operated latch 218 retaining the closure plate 215 closing the outlet 213 a batch of ice lumps is delivered into the holding device 208. On the delivery of the batch of ice lumps being completed, which would normally be determined by the pressure sensor monitoring the back pressure in the communicating conduit of a conveying apparatus, the latch 218 is released, thereby permitting the closure plate 215 to open under the weight of the batch of ice lumps, and the batch of ice lumps is delivered into the dispensing hopper 202. The closure plate 215 is then pivoted into the closed position closing the outlet 213 under the action of the return spring. On the closure plate 215 pivoting into the closed position, the solenoid operated latch 218 is engaged with the closure plate 215 thereby retaining the closure plate 215 closing the outlet 213. It is envisaged in certain cases that a time delay may be provided after a batch of ice lumps has been delivered into the holding device 208 before the solenoid operated latch 218 releases the closure plate 215 to ensure that the conveying air has exhausted through the exhaust vent 221, and the water has drained away through the drain tube 220. Any water which collects in the holding device 208 is drained through the drain outlet tube 220. The motor 228 is operated to drive the paddles 225 for discharging ice lumps through the dispensing outlets 203. The ice lumps are dispensed in metered quantities through the dispensing nozzle 236 by operating the button switch 237 as already described.

Referring now to FIGS. 25 and 26 there is illustrated a separator according to the invention indicated generally by the reference numeral 240 for separating conveying air from ice lumps, prior to the ice lumps being dispensed into a secondary storage means at a remote location. The separator 240 may be mounted directly in a dispensing hopper, such as, for example, the dispensing hopper 202 where a holding device is not provided, or may be mounted in a holding device 208 of the dispenser 200. Needless to say, the separator 240 may be provided in any hopper, bin or the like for holding ice lumps. The separator 240 comprises a housing having a base wall 242 and a top wall 243 joined by side walls 244 and 245 and end walls 246 and 247. The housing 241 defines a hollow interior region 248. An inlet port 249 to the interior region 248 is provided in the top wall 243 which may be connected to a main or secondary conduit of the conveying apparatus already described for delivering ice lumps and conveying air which may contain entrained water into the interior region 246. A diverting means comprising a plurality of spaced apart arcuate diverting bars 250 of circular cross section extend transversely of the interior region 248 between the end walls 246 and 147 for engaging and directing ice lumps through an outlet 251 in the end wall 247. The spacing between the bars 250 is set to prevent ice lumps passing between the bars 250. In this embodiment of the invention, the spacing between the bars 250 is 4 mm. Such a spacing, it has been found, is particularly suitable for dealing with ice lumps of maximum dimension 30 mm and minimum dimension 15 mm.

A drain means, namely, a drain outlet 252 is provided from the base wall 242 downstream of the diverting bars 250 for draining water from the interior region 248. A pipe 253 from the drain outlet is connected to a sump (not shown) for collecting the water. In practice, the pipe 253 and sump (not shown) would be airtight, thereby preventing conveying air passing through the drain outlet 252, although this is not necessary. An exhaust means comprising an exhaust grille 255 is provided in the end wall 246 for exhausting conveying air from the interior region 248. The grille 255 may exhaust to atmosphere or in certain cases, the exhausted air may be ducted from the grille 255.

A subhousing 257 comprising a top wall 258 and a pair of side walls 259 extends from the housing 241 around the outlet 251. Means for slowing down the ice lumps exiting through the outlet 251 comprises a damping means for absorbing some of the kinetic energy of the ice lumps. The damping means comprises a plate member 260 pivotally connected by a hinge 261 to the top wall 258. The plate member 260 depends downwardly into the path of the ice lumps discharged through the outlet 251 and extends transversely thereof. A pad 262 of a resilient plastics material mounted on the plate member 260 engages the ice lumps and absorbs some of the kinetic energy of the ice lumps. In certain cases, it is envisaged that the plate will be biased into the position substantially transversely of the path of the ice lumps by a spring, or a counter weight. Indeed, in certain cases, it is envisaged that the weight of the plate member 260 could be sufficient to absorb most of the kinetic energy of the ice lumps. The ice lumps, on striking the plate member 260, may pivot the plate member 260 slightly in the direction of the arrow A, and on the kinetic energy of the ice lumps being absorbed, the ice lumps then drop downwardly between the side walls 259. The bars 25 extend slightly through the outlet 251 to provide a smooth passage of the ice lumps through the outlet 251.

In use, it is envisaged that the separator will be mounted in an orientation with the side walls 244 and 245 and the end walls 246 and 247 extending substantially vertically. Ice lumps and conveying medium which may have entrained water are delivered through the inlet port 249 into the interior region 248. The ice lumps are diverted by the diverting bars 250 through the outlet 251. On engaging the closure flap 256, kinetic energy in the ice lumps is absorbed and the ice lumps drop between the side walls 259 of the subhousing 257. Air is exhausted through the exhaust grille 255 and water entrained in the air collects in the lower portion of the interior region 248 and drains through the drain outlet 252 into a sump (not shown).

Figure 27:
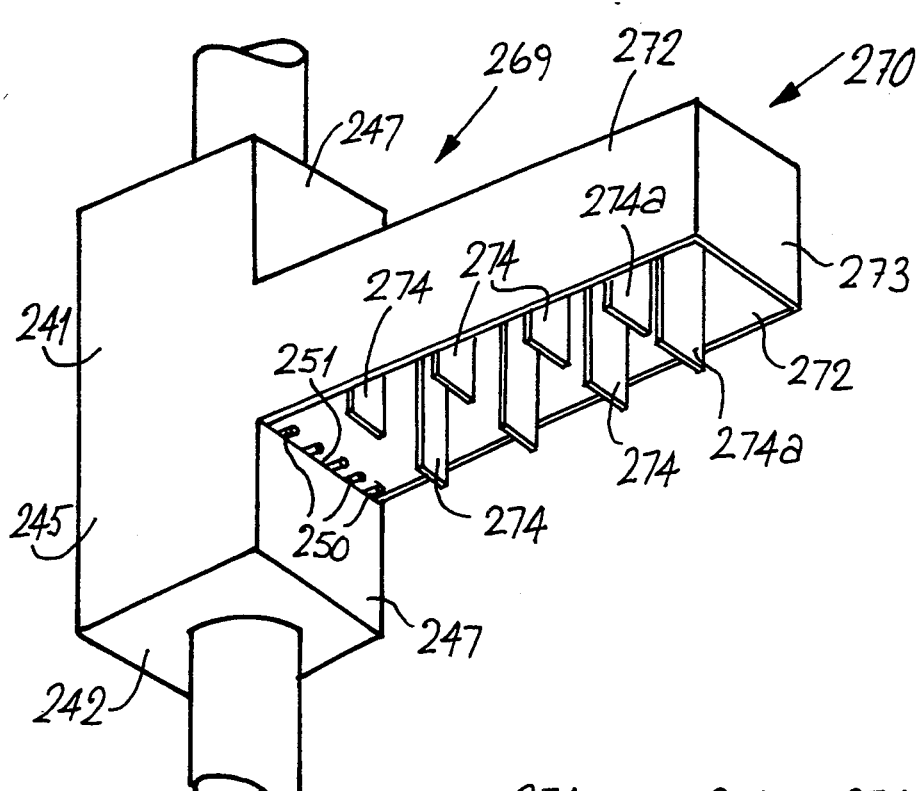
FIG. 27 is an underneath perspective view of a separator according to another embodiment of the invention.
Figure 28:
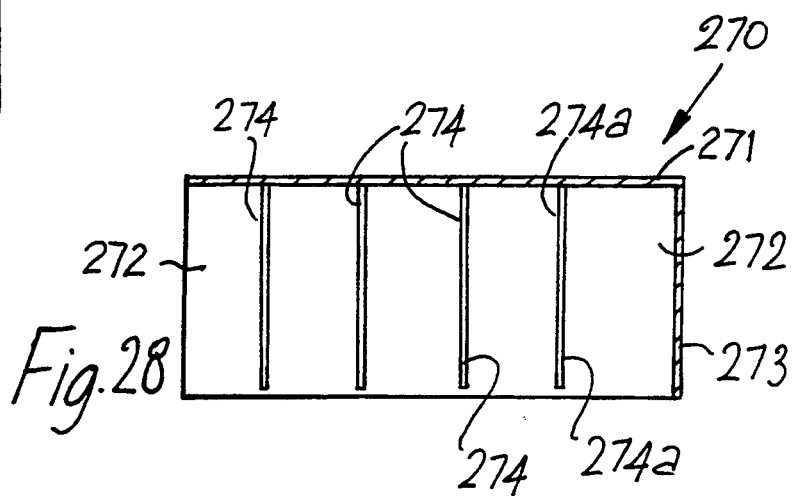
FIG. 28 is a side elevational view of portion of the separator of FIG. 27.
Figure 29:
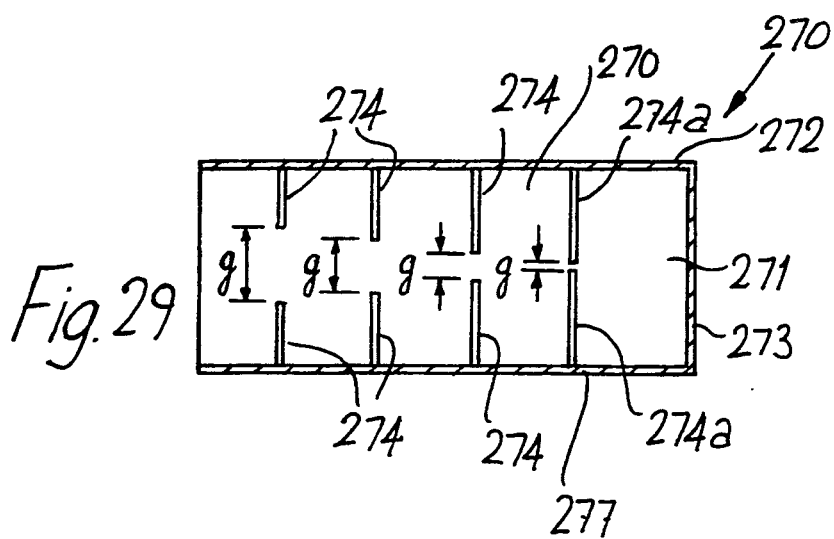
FIG. 29 is an underneath plan view of the portion of the separator of FIG. 27.

Referring now to FIGS. 27 to 29 there is illustrated a separator 269 according to another embodiment of the invention. In this case, the separator 269 is substantially similar to the separator 240, and similar components are identified by the same reference numerals. Only the subhousing which is indicated generally by the reference numeral 270 is different. The subhousing 270 comprises a top wall 271 and side walls 272 which extend from the housing 241 of the separator 269 around the outlet 251. An end wall 273 extends downwardly from the top wall 271 between the side walls 272. Damping means for slowing down the ice lumps in this case is provided by a plurality of baffles 274 mounted on the side walls 272 and extending transversely therefrom into the path of the ice lumps exiting from the outlet 251. The baffles 274 are of a resilient plastics material and are arranged in spaced apart pairs. The baffles 274 of each pair are spaced apart a distance g which decreases in a downstream direction. The baffles 274a of the pair furthest from the outlet 251 almost touch. The baffles 274 may be of any other resilient material, such as rubber or a synthetic rubber.

In use, as the ice lumps impinge on the baffles 274 the kinetic energy of the ice lumps is gradually absorbed by the baffles 274 until the ice lumps strike the pair of baffles 274a furthest from the outlet 251.

Referring now to FIGS. 30 to 32 there is illustrated a separator 279 according to another embodiment of the invention. The separator 279 is substantially similar to the separator 240 and similar components are identified by the same reference numeral. In this embodiment of the invention, only the subhousing which is indicated generally by the reference numeral 280 is different. The subhousing 280 comprises a plate 281 which extends from the end wall 247 of the housing 241 above the outlet 251. In this embodiment of the invention, the damping means for slowing down the ice lumps comprises a spiral track 283 formed on the underside of the plate 281 by a downwardly extending spiral wall 284 which extends downwardly from the plate 281. Side walls 285 and 286 extending from the housing 241 on each side of the outlet 251 direct ice lumps into the spiral track 283. The underside of the spiral track 283 is open. The kinetic energy of the ice lumps is absorbed as the ice lumps pass along the spiral track. On sufficient kinetic energy being absorbed, the ice lumps fall downwardly from the track 283. A bin, hopper or the like (not shown) would be mounted beneath the plate 281 for collecting the ice lumps.

Figure 34:
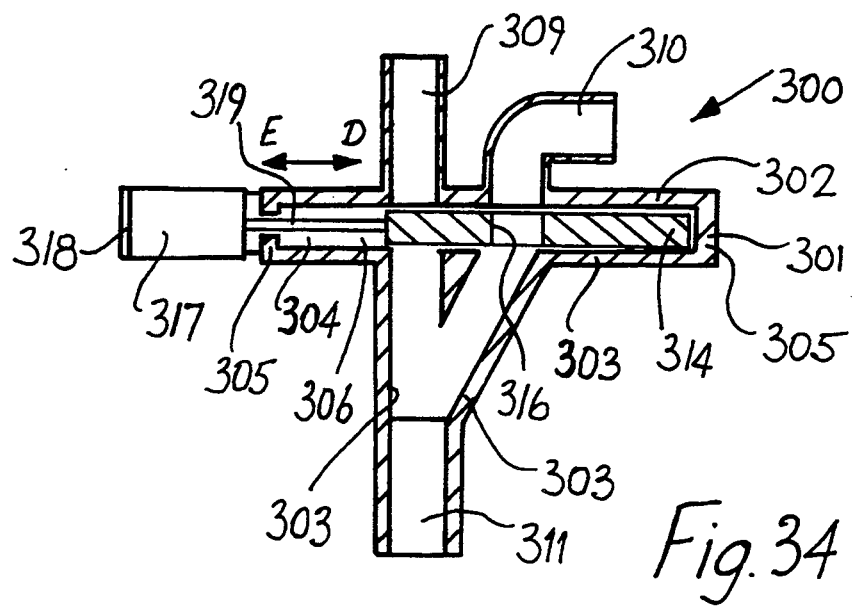
FIG. 34 is a side sectional view of the main valve of FIG. 33.
Figure 33:
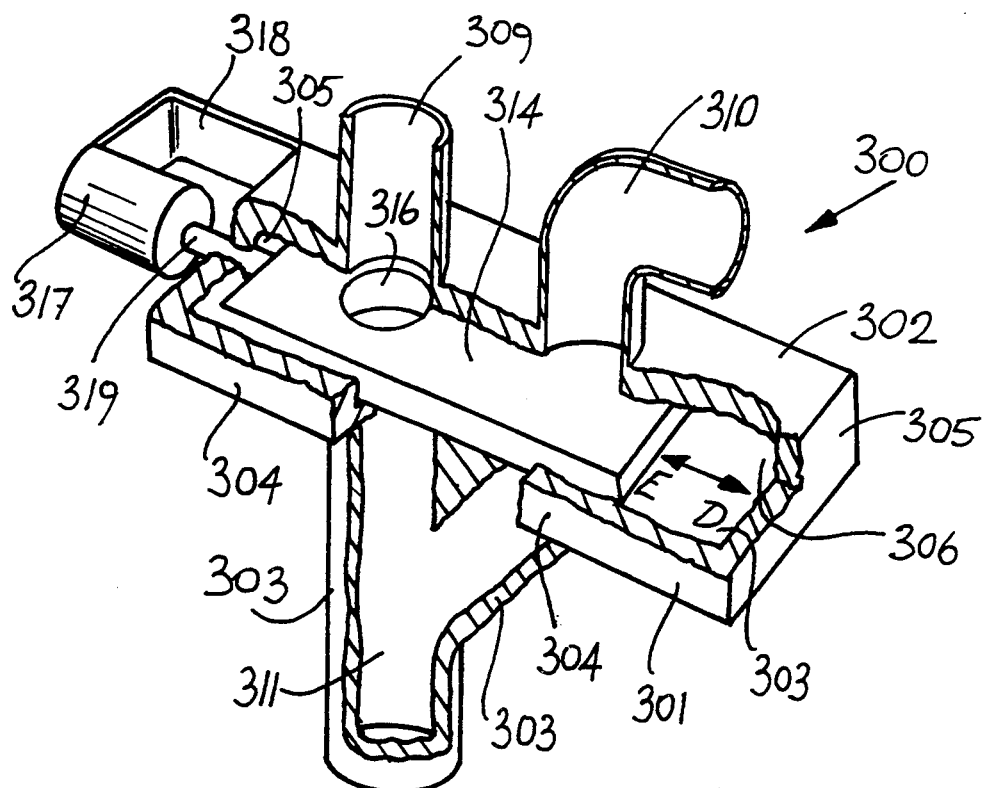
FIG. 33 is a partly cut-away perspective view of a main valve for use in any of the conveying apparatus.

Referring to FIGS. 33 and 34, there is illustrated an alternative means for alternately supplying a batch of ice lumps and conveying medium into the main conduit means which may be used in the conveying apparatus 1 of FIGS. 1 to 8, the conveying apparatus 70 of FIGS. 9 to 16 and the conveying apparatus 140 of FIGS. 17 and 18. This means for alternately supplying a batch of ice lumps and conveying medium into the conveying conduit comprises a main valve also according to the invention indicated generally by the reference numeral 300. The main valve 300 comprises a housing 301 of steel having a top wall 302 and a bottom wall 303 joined by side and end walls 304 and 305, respectively. The housing defines a hollow interior region 306. A pair of inlet ports 309 and 310 extending from the top wall 302 adjacent each other communicate with the interior region 306. The inlet port 309, in use, is connected to the connecting conduit for communicating the inlet port 309 with an ice lump source, namely, a main storage hopper for the delivery of ice lumps to the inlet port 309. The inlet port 310, in use, is connected to a communicating conduit for delivering a conveying medium to the inlet port 310 from a conveying medium source. An outlet port 311 communicating with the interior region 306 extends from the bottom wall 303 for connecting the main valve 11 to a main conduit, for example, the main conduit 5 of the apparatus 1 or the main conduit 73 of the apparatus 70 or 140. A valving member, namely, a valve plate 314 is slidable within the interior region 306 for alternatively communicating the outlet port 311 with the inlet port 309 and the inlet port 310. A valving opening 316 in the valve plate 314 communicates the outlet port 311 with the inlet port 309 when the valve plate 314 is in an ice delivery position as shown in FIG. 33 for delivering batches of ice lumps into the main conduit. The valving opening 316 communicates the outlet port 311 with the inlet port 310 when the valve plate 314 is in a conveying medium supply position as shown in FIG. 34 for supplying conveying air into the main conduit. Means for switching the main valve 300 from the ice delivery position to the conveying medium supply position, and vice versa, comprises a solenoid 317 mounted on the housing 301 by a bracket 318. A connecting rod 319 connects the solenoid 317 to the valve plate 314 for sliding the valve plate 314 from the ice delivery position to the conveying medium supply position and vice versa, in the direction of the arrows D and E, respectively. Suitable seals (not shown), for example, 0-ring seals substantially similar to the 0-ring seals described in the diverter valves 75 with reference to FIGS. 10 to 14 are provided in the housing 301 between the top and bottom walls 302 and 303 and the valve plate 314 so that when the valve plate 314 is in the ice delivery position, the inlet port 310 is isolated from the outlet port 311. Similarly, when the valve plate 314 is in the conveying medium supply position, the inlet port 309 is isolated from the outlet port 311.

While the means for switching the main valve 300 from the ice delivery position to the conveying medium supply position and vice versa has been described as comprising a solenoid, any other suitable switch means may be used. Indeed, in certain cases, it is envisaged that a pneumatic ram, hydraulic ram or the like may be used. It will of course be appreciated that throughout the description of the various embodiments of the invention, where solenoids have been described for switching valves or moving components, any other suitable equivalent switching or moving means may be used, such as, for example, a pneumatic ram, hydraulic ram or the like.

Indeed, it will also be appreciated that where electrically powered motors have been described for driving various components, such as, for example, discharge paddles, air blowers and the like, any other suitable means for driving such components may be provided, for example, pneumatic motors, hydraulic motors and the like.

Further, it will be appreciated that in certain cases, some or all of the various valve means and means for alternately supplying a batch of ice lumps and conveying medium into a conduit may be operated by any other means, and indeed, in certain cases, may be manually operated.

While a particular construction of main storage hoppers have been described, any other suitable type and construction of main storage hoppers may be used. Needless to say, ice lumps may be provided from an ice lump source other than a storage hopper. Further, while the second storage means at the remote locations have been described as being dispensers, any other secondary storage means may be used, for example, a bin from which ice lumps would be manually scooped, a hopper or any other suitable storage means. Further, while the dispensers at the remote locations have been described as being provided with sensors for sensing the level of ice lumps in the dispensers, this is not necessary. Where the secondary storage means are provided by bins from which ice would be manually removed, a sensor may not be provided. However, in such a case, where it was desirable that the bin at the remote location should be polled to ascertain if a demand for ice existed, it is envisaged that a manually operated switch would be provided adjacent the bin which an operator could activate should ice lumps be required. This switch would be polled by the polling routine.

Additionally, in the event that a level sensor for determining when the dispensers at the remote locations are full is not provided, it is envisaged that on a demand for ice being made by a dispenser, a predetermined number of batches of ice lumps will be conveyed to the dispenser demanding ice. In practice, it is envisaged that either the dispenser would have a minimum level sensor which on the level of ice lumps dropping to the minimum level sensor, an ice lump demand signal would be triggered. This would, in due course, be polled by the polling routine. Alternatively, if a dispenser were provided with no level sensor, the discharge of ice lumps from the dispenser would be monitored for determining when a demand for ice existed in a dispenser. In other cases, it is envisaged that a demand for ice signal at a dispenser may be triggered manually by an operator operating a switch at or adjacent the dispenser. In such a case of manual triggering of an ice demand signal, it is envisaged that the number of ice batches delivered to the dispenser may also be determined manually by the operator, who would merely operate a switch to terminate conveying of batches of ice lumps.

Further, it will be appreciated that while the control circuit of the various conveying apparatus have in all cases polled the dispensers at the remote location to ascertain if a demand for ice existed, this is not essential. In certain cases, it is envisaged that the control circuit would not poll the dispensers at the remote locations, and in which case, it is envisaged that when a demand for ice existed at a dispenser at a remote location, an ice demand signal would be relayed to the control circuit. The ice demand signal could be relayed over cabling, or could be transmitted by radio, microwaves or the like. Such signal would, as well as indicating a demand for ice, identify the dispenser at the remote location demanding ice.

It will of course be appreciated that where the control circuit does poll the dispensers at remote locations, the polling may be carried out by signals relayed along cables or transmitted by radio, microwave signals or the like.

Needless to say, any suitable type of sensing means for sensing ice level may be used, mechanical sensors may be used, thermosensors may be used, infra-red, ultra-sonic or light sensors or the like may be used as desired.

While the conveying medium has been described as being air, any other suitable conveying medium may be used, although needless to say, air, in general, would be the most convenient conveying medium. While an air blower has been described for providing the conveying air, any other suitable conveying air or medium source may be used. For example, a compressor, further the conveying medium or air may be held in a receiver which would be fed by a compressor or an air blower or the like. While the conveying air has been described as being supplied at a particular pressure, the conveying air may be supplied at any other desired pressure. It is believed where the apparatus is required to deliver ice lumps over relatively short runs, a lower air pressure would be acceptable than for long runs.

Further, while the conveying apparatus has been described for conveying ice lumps with a maximum dimension of 30 mm, the conveying apparatus is suitable for conveying ice lumps of other maximum dimensions. However, where the maximum dimension is relatively high, allowance will have to be made in the cross sectional area of the conveying conduit. It is believed that a conveying conduit of circular cross section is preferable to other cross sections, and where conveying conduits of circular cross section is used, it is recommended that the diameter of the internal cross section of the conduit should be at least 10% greater than the maximum dimension of an ice lump. Although it is preferable that the diameter of the conveying conduit should be at least 30% greater than the maximum dimension of the ice lumps being conveyed. Needless to say, conveying conduits of other cross sections besides circular cross sections may be used. Where conveying conduits of cross sections other than circular cross sections are used, it is believed that the minimum transverse dimension of the conveying conduit should be at least 10% greater than the maximum dimension of the ice lumps being conveyed, and preferably, the minimum transverse dimension of the conveying conduit should be at least 30% greater than the maximum dimension of the ice lump. All the above relationships between the maximum dimension of an ice lump and the dimensions of the cross sectional area of the conveying conduit have been given as recommendations only. They are not intended to limit the scope of the invention or the claims in any way.

As mentioned above, the method and conveying apparatus may also be used for conveying a particle or particles of ice, a flake or flake of ice, for example, flake ice.

While the means for alternately supplying ice lumps and conveying medium into the conveying conduit have been described as comprising a main valve means, any other suitable means for alternately supplying ice lumps and conveying medium may be used. Where a valve means is used, any suitable type of valve means besides a flap valve or the valve of FIGS. 33 and 34 may be used. Additionally, other means for switching the main valve of the conveying apparatus of FIGS. 1 to 8, FIGS. 9 to 17 and FIGS. 18 to 22 may be used besides a counterweight for returning the valving flap of the valve. For example, a return spring may be used, or any other suitable biasing or urging means may be used, as well as, for example, a solenoid, pneumatic or hydraulic ram or the like. Alternatively, it is envisaged that a valve means may be dispensed with altogether and the means for alternately supplying ice lumps and conveying medium into the conveying conduit would be provided by a combination of the metering means and a means for alternately isolating the conveying medium source from the conveying conduit. For example, the isolating means may comprise a valve such as, for example, a gate valve or the like in the communicating conduit. Alternatively, the means for isolating the conveying medium source may comprise a means for switching on and switching off the air blower motor or compressor or the like to provide conveying medium as required. Additionally, it will be appreciated that, if desired, in the conveying apparatus of FIGS. 1 to 8, FIGS. 9 to 16, FIGS. 17 and 18 and FIGS. 19 to 22, the conveying air source could be left activated continuously. In other words, the motor driving the blower would be left running continuously. Alternatively, where the conveying air source is provided by a compressor and receiver, the compressor and receiver would continuously supply air into the communicating conduit. The supply of conveying air from the communicating conduit into the main conduit would then be controlled by the main valve or valves as the case may be. Alternatively, an isolating valve may be provided in the communicating conduit for controlling the supply of conveying air to the main valve or into the main conduit.

Needless to say, any other suitable metering means besides a metering valve may be provided for metering a batch of ice lumps into the conveying conduit. While the ice lumps have been described as being delivered into the conveying conduit from the main storage hopper under gravity, any other suitable means may be used.

While diverter valves of a particular shape and construction have been described, any other suitable type of diverter valves means may be used.

It is also envisaged that in the conveying apparatus 150 of FIGS. 19 to 22, while it is preferable that the conveying medium should be continuously delivered into the main conveying conduit, in certain cases, it is envisaged that the air may be intermittently delivered into the conveying conduit, and would be alternately delivered into the conveying conduit with the ice lumps. In other words, a batch of ice lumps would be delivered into the conveying conduit and then the conveying air would be delivered into the conveying conduit and so on. The air would not be delivered into the conveying conduit until the batch of ice lumps had been conveyed to the remote location at which stage the conveying air would be de-activated and the next batch of ice lumps would be delivered into the conveying conduit.

Needless to say, the conveying apparatus 150 of FIGS. 19 to 22 may be used for conveying a batch of ice lumps from an ice lump source to a single remote location. For example, in certain cases, it is envisaged that a plurality of main conduits 153 would be provided between the main storage hopper 150 and a plurality of respective remote locations. Each main conduit 153 would deliver to one remote location only. This would be a similar arrangement to the arrangement of the apparatus 1 of FIGS. 1 to 8, but with the exception that the conveying air and batches of ice lumps would be delivered into the main conduit using the nozzle arrangement 161 of the apparatus 150.

While a particular construction of dispenser has been described in FIGS. 23 and 24, other constructions could be provided. It will of course be appreciated that other constructions of holding device may be provided. For example, while it is preferable it is not essential that the side wall of the holding device should diverge outwardly downwardly. Other suitable valve means for holding a batch of ice lumps in the holding device may be provided besides a flap valve. Needless to say, any other suitable exhaust means may be provided and other suitable drain means may be provided from the holding device.

Other suitable metering apparatus may be used besides the metering apparatus described in the dispensing tubes 204 and needless to say, the metering apparatus in the dispensing tubes 204 may be dispensed with.

It is also envisaged that separators of other shape and construction may be used. Other suitable diverting means besides diverting bars may be provided, any permeable type of diverting means may be used. Other means for slowing down ice lumps may be used in the separators, and such means may be dispensed with.

Furthermore, it will be appreciated that while in the embodiments of the invention described, the batch size of ice lumps is constant for each apparatus, it will of course be appreciated that the batch size may vary from apparatus to apparatus. Furthermore, the batch size may vary within a particular conveying apparatus, for example, where some dispensers at remote locations are at considerably longer distances from the ice lump source than others, then the batches of ice lumps to the more remote locations may be smaller than the batches of ice lumps being delivered to the nearer remote locations. Furthermore, it will be appreciated that the batches of ice lumps may vary from conveying cycle to conveying cycle. Since the batches of ice lumps are determined by the length of time the metering valve is open and the discharge paddles operate, while this gives a relatively constant batch size of ice lumps, it will, of course, be appreciated that some drift and variation may occur from time to time. Accordingly, it will be readily apparent to those skilled in the art that it is not essential for the size of batches of ice lumps to be constant in each conveying apparatus, and indeed, for conveying to each remote location.

It is also envisaged in some embodiments of the invention that the main valve means could act as a metering means for metering batches of ice lumps of predetermined weight into the main conduit means. By timing the period of time for which the main valve means is in the ice delivery position, the weight of a batch of ice lumps delivered into the conveying conduit means could be relatively accurately controlled.

Further, it will be appreciated that in many cases a secondary conduit may have other secondary conduits branched therefrom. In general, it is envisaged that each secondary conduit branched from another secondary conduit would be connected to the secondary conduit by a diverter valve means.

While the conveying apparatus has been described for conveying batches of ice lumps from an ice lump source to a plurality of remote locations, the apparatus may be used for conveying batches of ice lumps from an ice lump source to a single remote location only. Furthermore, it is envisaged that the apparatus may be used for conveying a single batch of ice lumps to a remote location.

It will also be appreciated that in the embodiment of the invention described with reference to FIGS. 17 and 18, a mechanical linkage may be provided between the maximum level sensor 137 and the ice maker 141 for switching off the ice maker in the event of the level of ice lumps in the main storage hopper 71 reaching the maximum level sensor 137.

While in the embodiments of the invention described, the conveying apparatus has been illustrated as comprising four dispensers at four discrete locations, any number of dispensers or other storage means at any number of locations may be provided. Indeed, in certain cases, the conveying apparatus may be used for conveying ice lumps from an ice lump source to a single remote location. Furthermore, it will be appreciated that it is not necessary to provide a storage means at a remote location, the ice lumps may be delivered at the remote location through a nozzle or the like for immediate use.

We claim:

1. A method for conveying ice lumps from an ice lump source to a remote location through a conveying conduit means by a conveying medium, the method comprising the steps of sequentially:
   delivering a batch of ice lumps into the conveying conduit means at an upstream end of the conveying conduit means, with the conveying medium isolated from the conveying conduit means,
   supplying the conveying medium to the conveying conduit means after the batch of ice lumps has been delivered into the conveying conduit means for conveying the batch of ice lumps to the remote location,
   the supply of conveying medium being cut off to the conveying conduit means on each batch of ice lumps having been delivered to the remote location, and
   the next batch of ice lumps being delivered into the conveying conduit means on the previous batch having been delivered to the remote location.

2. A method as claimed in claim 1, wherein the batch of ice lumps are conveyed through the conveying conduit means at a rate in which the weight of each batch of ice lumps does not exceed 10 grammes of ice for each one square millimetre of cross sectional area of the conveying the conduit means.

3. A method as claimed in claim 1 in which the conveying medium is supplied to the conveying conduit means at the upstream end thereof.

4. A method for conveying ice lumps from an ice lump source to a remote location through a conveying conduit means by a conveying medium, the method comprising the steps of sequentially:
   delivering a batch of ice lumps into the conveying conduit means at an upstream end of the conveying conduit means, with the conveying medium isolated from the conveying conduit means,
   supplying the conveying medium to the conveying conduit means after the batch of ice lumps has been delivered into the conveying conduit means for conveying the batch of ice lumps to the remote location, and
   monitoring the conveying conduit means to determine when a batch of ice lumps has been delivered to a remote location.

5. A method as claimed in claim 4 in which the method comprises the step of alternately delivering a batch of ice lumps and supplying conveying medium to the conveying conduit means for conveying a plurality of batches of ice lumps.

6. A method as claimed in claim 4 in which the monitoring means is a pressure sensor for monitoring the pressure of the conveying medium.

7. A method for conveying ice lumps from an ice lump source to a remote location through a conveying conduit means by a conveying medium, the method comprising the steps of sequentially:
   polling the remote location to determine if a demand for ice lumps exists,
   on a demand being determined to exist at the remote location, conveying a predetermined number of batches of ice lumps to the remote location as follows,
   delivering a batch of ice lumps into the conveying conduit means at an upstream end of the conveying conduit means, with the conveying medium isolated from the conveying conduit means, and
   supplying the conveying medium to the conveying conduit means after the batch of ice lumps has been delivered into the conveying conduit means for conveying the batch of ice lumps to the remote location.

8. A method for conveying ice lumps from an ice lump source to a plurality of remote locations through a conveying conduit means by a conveying medium, the method comprising the steps of:
   sequentially polling the remote locations to determine if a demand for ice lumps exists at the remote locations, on a demand being determined to exist at a remote location, conveying at least one batch of ice lumps to that remote location as follows, delivering a batch of ice lumps into the conveying conduit means at an upstream end of the conveying conduit means, with the conveying medium isolated from the conveying conduit means, supplying the conveying medium to the conveying conduit means after the batch of ice lumps has been delivered into the conveying conduit means for conveying the batch of ice lumps to the remote location, and polling the next sequential remote location.

9. A method as claimed in claim 8 in which a plurality of batches of ice lumps are delivered to a remote location on a demand being determined to exist at that remote location.

10. A method as claimed in claim 8 in which the method includes the step of setting the conveying conduit means to communicate the ice lump source with the remote location demanding ice lumps prior to a batch of ice lumps being delivered into the conveying conduit means.

11. A method as claimed in claim 10 in which the method further comprises the step of supplying the conveying medium to the conveying conduit means prior to setting the conveying conduit means for clearing the conveying conduit means of residual matter prior to setting the conveying conduit means.

12. A method for conveying ice lumps from an ice lump source to a remote location through a conveying conduit means by a conveying medium, the method comprising the steps of sequentially:

delivering a batch of ice lumps into the conveying conduit means at an upstream end of the conveying conduit means, with the conveying medium isolated from the conveying conduit means, and supplying the conveying medium to the conveying conduit means after the batch of ice lumps has been delivered into the conveying conduit means for conveying the batch of ice lumps to the remote location, the ice lump source being isolated from the conveying conduit means while the conveying medium is being delivered into the conveying conduit means.

13. A method as claimed in claim 12 in which the method comprises the step of alternately delivering a batch of ice lumps and supplying conveying medium to the conveying conduit means for conveying a plurality of batches of ice lumps.

14. A method for conveying ice lumps from an ice lump source to a remote location through a conveying conduit means, the method comprising the steps of:

intermittently delivering a plurality of batches of ice lumps into the conveying conduit means at an upstream end of the conveying conduit means, and continuously supplying a conveying medium to the conveying conduit means for conveying the intermittently delivered batches of ice lumps to the remote location, wherein only one batch of ice lumps is in he conveying conduit means at any one time.

15. A method as claimed in claim 14 in which the conveying medium is supplied to the conveying conduit means at the upstream end thereof.

* * * * *